US005565636A

United States Patent [19]
Sugiyama

[11] Patent Number: 5,565,636
[45] Date of Patent: Oct. 15, 1996

[54] KEYBOARD MUSICAL INSTRUMENT EQUIPPED WITH DRIVING UNIT FOR HAMMER STOPPER LOCATED IN WIDE SPACE IN FRONT OF HAMMER ASSEMBLIES

[75] Inventor: Nobuo Sugiyama, Shizuoka-ken, Japan

[73] Assignee: Yamaha Corporation, Japan

[21] Appl. No.: 347,941

[22] Filed: Nov. 30, 1994

[30] Foreign Application Priority Data

| | | | |
|---|---|---|---|
| Nov. 30, 1993 | [JP] | Japan | 5-323436 |
| Jun. 17, 1994 | [JP] | Japan | 6-135732 |
| Aug. 30, 1994 | [JP] | Japan | 6-205260 |

[51] Int. Cl.$^6$ .................... G01D 15/00

[52] U.S. Cl. .................... 84/171; 84/236; 84/423 R; 84/719; 84/DIG. 7

[58] Field of Search .................... 84/2, 170, 171, 84/172, 221, 236, 719, 423 R, DIG. 7, 744

[56] References Cited

U.S. PATENT DOCUMENTS 5,386,083 1/1995 Kawamura .................... 84/719

*Primary Examiner*—Patrick J. Stanzione
*Attorney, Agent, or Firm*—Graham & James LLP

[57] ABSTRACT

A keyboard musical instrument has a hammer stopper provided between strings and hammer assemblies and operative to prevent the strings from hammer heads for electronically producing sounds in response to a fingering on a keyboard, and a driving mechanism for the hammer stopper is provided on the opposite side of the hammer assemblies so as to accommodate the driving mechanism in a wide space.

9 Claims, 17 Drawing Sheets

ELECTRONIC SOUND GENERATING SYSTEM

KEYBOARD MUSICAL INSTRUMENT EQUIPPED WITH DRIVING UNIT FOR HAMMER STOPPER LOCATED IN WIDE SPACE IN FRONT OF HAMMER ASSEMBLIES

FIELD OF THE INVENTION

This invention relates to a keyboard musical instrument and, more particularly, to a keyboard musical instrument equipped with a hammer stopper for allowing a player to perform a music with either acoustic or electronic sounds.

DESCRIPTION OF THE RELATED ART

A typical acoustic piano is equipped with a soft pedal for lessening volume, and the soft pedal allows a player to play with expression. The soft pedal incorporated in an upright piano moves home positions of hammers, and decreases a distance between the hammer heads and the associated strings. When a key is depressed, the key action mechanism rotates the hammer over the decreased distance, and softly impacts the strings. On the other hand, the soft pedal incorporated in the grand piano laterally offsets the hammers from the associated sets of strings. When a player depresses a key, the key action mechanism rotates the hammer, and the hammer strikes a smaller number of strings. Thus, the soft pedal merely lessens the volume in a performance.

U.S. Pat. No. 2,250,065 discloses a piano with a pull-up mechanism, and the pull-up mechanism separates the hammer butts from the jacks. While the pull-up mechanism is separating the hammer butts from the jacks, the jacks do not escape from the hammer butts, and swishes the air. Key sensors and an electric tone controlling circuit are incorporated in the piano, and the electric tone controlling circuit generates electric sounds instead of the acoustic sounds produced through vibrations of the strings. Thus, the keyboard is shared between the key action mechanisms and the electric tone controlling circuit, and a player practices fingering on the keyboard with either acoustic or electric sounds. However, the piano disclosed in the U.S. Patent encounters a problem in that the pull-up mechanism spoils the unique key touch, because the jacks do not escape from the hammer butts.

In order to maintain the key touch, the present inventor proposes a keyboard musical instrument in Japanese Patent Application No. 4-200581, and a stopper and a change-over unit are installed in narrow space between the damper mechanisms and the hammer assemblies. The manufacturer scales down the stopper and the change-over unit, and accurately machines the component parts of the stopper and the change-over unit. Thus, the stopper and the change-over unit are costly, and increases the price of the keyboard musical instrument.

Moreover, the narrow space requires an assembling worker to exactly locate the stopper and the change-over unit in the keyboard musical instrument, and a assembling worker hardly tunes the stopper and the change-over unit at user's home. If the stopper is slightly closer to the hammer rail than a standard position, the hammer shank is brought into contact with the stopper before the escape of the jack, and the hammers are stuck between the stopper and the jack.

If the jacks are set to escape from the hammer butts earlier, the hammers may be free from the stick between the stopper and the jacks. However, the early escape varies the key touch, and the keyboard musical instrument hardly gives the stable key touch between the silent mode and the electronic sound mode.

SUMMARY OF THE INVENTION

It is therefore an important object of the present invention to provide a keyboard musical instrument a stopper of which is not expensive and easily set to an appropriate position.

To accomplish the object, the present invention proposes to provide a driving mechanism at the back of a plurality of hammer assemblies for driving a stopper projecting into a space in front of the plurality of hammer assemblies.

In accordance with the present invention, there is provided a keyboard musical instrument having at least an acoustic sound mode and an electronic sound mode, comprising: a) an acoustic piano having a keyboard implemented by a plurality of keys depressed by a player in both acoustic and electronic sound modes and respectively assigned notes of a scale, a plurality of key action mechanisms functionally connected to the plurality of keys, respectively, and selectively actuated by keys depressed by the player, a plurality of hammer assemblies respectively associated with the plurality of key action mechanisms and selectively driven for rotation by the actuated key action mechanisms, and a plurality of sets of strings respectively associated with the plurality of hammer assemblies and selectively struck by the hammer assemblies driven by the actuated key action mechanisms for producing acoustic sounds with tones identical with the tones of the depressed keys; b) an electronic sound generating system monitoring the keyboard for detecting the depressed keys, and producing electronic sounds with tones identical with the tones of the depressed keys; and c) a controlling system having a stopper projecting into a space between the plurality of hammer mechanisms and the plurality of sets of strings, and changed between a free position in the acoustic sound mode and a blocking position in the electronic sound mode, the hammer assemblies driven by the actuated key action mechanisms rebounding on the stopper in the blocking position before striking the associated sets of strings, the hammer assemblies driven by the actuated key action mechanisms striking the associated sets of strings without an interruption by the stopper in the free position, and a driving means provided in another space opposite to the space with respect to the plurality of hammer assemblies, and changing the stopper between the free position and the blocking position.

BRIEF DESCRIPTION OF THE DRAWINGS

The feature and advantages of the keyboard musical instrument according to the present invention will be more clearly understood from the following description taken in conjunction with the accompanying drawings in which.

DESCRIPTION OF THE PREFERRED EMBODIMENTS

First Embodiment

Figure 1:
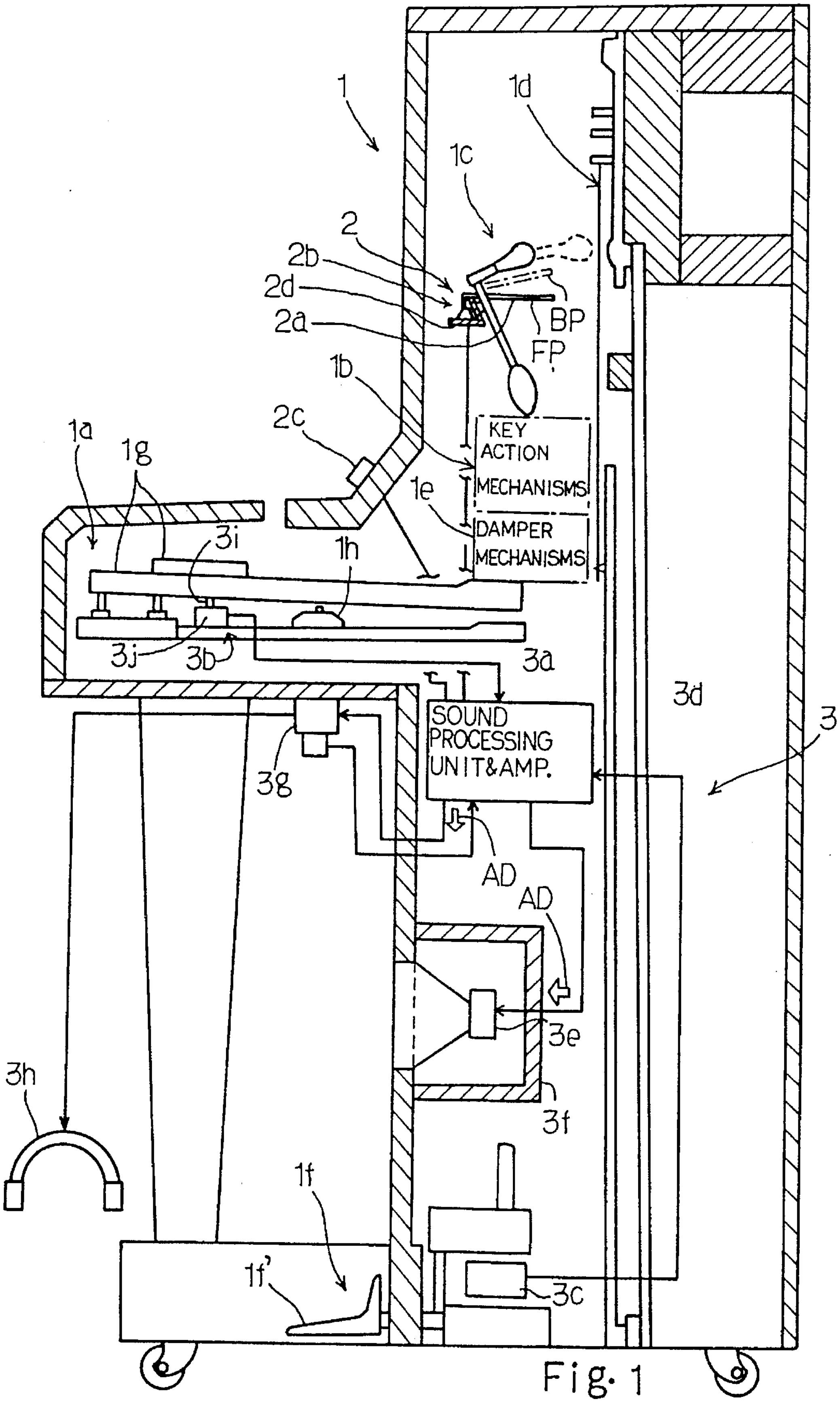
FIG. 1 is a partially cut-away side view showing the structure of a keyboard musical instrument according to the present invention.

Referring first to FIG. 1 of the drawings, a keyboard musical instrument embodying the present invention largely comprises an acoustic piano 1, a controlling system 2 and an electronic sound generating system 3, and has at least an acoustic sound mode and a silent mode. In the following description, the directions "clockwise" and "counter clockwise" are determined on the paper where a referenced figure is illustrated, and term "front" means a closer position to a player playing the keyboard musical instrument.

While the keyboard musical instrument is staying in the acoustic sound mode, the keyboard musical instrument serves as a standard acoustic upright piano, and the sounds and the key-touch are identical with those of the acoustic upright piano.

On the other hand, when the keyboard musical instrument is changed to the silent mode, the electronic sound generating system 3 generates music tone signals in response to the fingering, and electronic sounds are produced as will be described hereinlater. The electronic sound generating system 3 may be silent in the silent mode by manipulating a switch or pulling out a jack of a headphone from a socket.

The keyboard musical instrument may have a recording mode, a playback mode and an ensemble mode. The electronic sound generating system 3 records a performance in a suitable memory in the recording mode, and reproduces the performance in the playback mode. In the ensemble mode, a player enjoys an ensemble with the electronic sound generating system 3, and both of the acoustic piano 1 and the electronic sound generating system 6 produce the acoustic sounds and the electronic sounds.

In this instance, the acoustic piano 4 is of the upright type. However, a grand piano is available for the keyboard musical instrument.

The acoustic piano 1 comprises a keyboard 1*a*, a plurality of key action mechanisms 1*b*, a plurality of hammer mechanisms 1*c*, a plurality of sets of strings 1*d*, a plurality of damper mechanisms 1*e* and a pedal mechanism 1*f*. The keyboard 1*a* is mounted on a key bed, and is implemented by black and white keys 1*g*. The black and white keys 1*g* are turnable around balance pins embedded in a balance rail 1*h*.

The key action mechanisms 1*b* are functionally connected to the rear ends of the black and white keys 1*g*, respectively, and drive the hammer mechanisms 1*c* for rotations toward the sets of strings 1*d*. Thus, the key action mechanisms 1*b* convert upward motions of the black and white keys 1*g* to rotations of the associated hammer assemblies 1*c*, and give unique piano key touch to a player in cooperation with the hammer assemblies 1*c*.

The strings 1*d* are fixed to a frame by means of tuning pins and hitch pins, and notes of a scale is assigned to the plurality of sets of strings 1*d*, respectively.

The key action mechanisms 1*b* are arranged along the lateral direction of the keyboard musical instrument, and are grouped into a plurality of key action groups. The key action mechanisms 1*b* are similar in structure to one another, and each key action mechanism 1*b*, the associated hammer assembly 1*c* and the associated damper mechanism 1*e* are illustrated in detail in FIG. 2 together with the set of strings 1*d*.

A center rail 90 laterally extends over the keyboard 1*a*, and is shared between the key action mechanism 1*b*, the hammer assembly 1*c* and the damper mechanism 1*e*. The key action mechanism 1*b* comprises a whippen assembly 100 in contact with a capstan button 101 implanted into a rear end portion of the associated key 1*g* and a whippen flange 102 fixed to the center rail 90, and the whippen assembly 100 is swingably supported around the whippen flange 102. While the capstan button 101 is pushing up the whippen assembly 100, the whippen assembly 100 rotates around the whippen flange 102 in the clockwise direction.

The key action mechanism 1*b* further comprises a regulating button 103 fixed to the center rail 90 and laterally projecting therefrom, a jack flange 104 fixed to the whippen assembly 100 and projecting upwardly therefrom, a jack 105 swingably supported by the jack flange 104 and a jack spring 106 provided between the whippen assembly 100 and the toe 105*a* of the jack 105. When the key 1*g* is in the rest position, the regulating button 103 is spaced from the toe 105*a* of the jack 105. While the key 1*g* is moving from the rest position to the end position, the capstan button 101 pushes up the whippen assembly 100, and the toe 105*a* is brought into contact with the regulating button 103. After the contact between the toe 105*a* and the regulating button 103, the rotation of the whippen assembly 100 renders the jack 105 rotation around the jack flange 104, and the jack spring 106 is compressed. Then, the jack spring 106 expands, and urges the jack 105 to quickly rotate around the jack spring 106. As a result, the jack 105 escapes from the hammer assembly 1*c*, and the hammer assembly 1*c* is drive for rotation toward the set of strings 1*d*. The escaping point is regulable by changing the distance D between the toe 105a and the regulating button 103. If the distance D is increased, the hammer assembly 1c flies over a relatively narrow distance d to the set of strings 1d after the escape. However, if the distance D is decreased, the jack 105 escapes from the hammer assembly 1c earlier than the escaping point at the wide distance D, and the hammer assembly 1c rotates over a relatively wide distance d. The distance d is regulated to 2 to 3 millimeters in a standard upright piano, and the keyboard musical instrument implementing the present invention has the distance d ranging from 3 millimeters to 5 millimeters, because the jacks 105 are expected to surely escape from the hammer assemblies 1c in the silent mode.

The hammer assembly 1c comprises a hammer butt 110 engaged with the top 105b of the jack 105, a hammer shank 111 implanted into the hammer butt 110 and a hammer head 112 connected to the leading end of the hammer shank 111, and the hammer butt 110 is rotatably supported by a butt flange 113 fixed to the center rail 90. The hammer butt 110 is kicked by the jack 105, and rotates around the butt flange 113.

The hammer assembly 1c further comprises a catcher shank 114 projecting from the hammer butt 110, a catcher 115 fixed to the leading end of the catcher shank 114, a butt spring 116 urging the hammer butt 110 to return to a home position, a back check 117 projecting from the whippen assembly 100, a bridle tape 118 fixed to the catcher shank 114 and a bridle wire 119 projecting from the whippen assembly 100 for anchoring the bridle tape 118.

After the hammer head 112 rebounds on the strings 1d or a stopper described hereinlater, the hammer assembly 1c rotates in the clockwise direction until the engagement of the catcher 115 with the back check 117, and returns to the home position. The bridle tape 118 links the hammer assembly 1c with the key action mechanism 1b, and prevents the set of strings 1d from a double strike with the hammer head 112.

The damper mechanism 1e comprises a damper lever flange 130 fixed to the center rail 90, a damper lever 131 rotatably supported by the damper lever flange 130, a damper lever spring 131 urging the damper lever 131 in the counter clockwise direction, a damper wire 133 implanted into the damper lever 131, a damper head 134 fixed to the leading end of the damper wire 133 and a damper spoon 135 projecting from the whippen assembly 100 and held in contact with the damper lever 131 at the opposite end to the damper head 134.

When the key 1g is in the rest position, the damper spring 132 urges the damper lever 131 to bring the damper head 134 into contact with the set of strings 1d, and the strings 1d are not allowed to vibrate. If the key 1g is depressed, the damper spoon 135 pushes the damper lever 131, and the damper lever 131 rotates in the clockwise direction against the damper spring 132. As a result, the damper head 134 leaves the set of strings 1d, and allows the strings to vibrate upon the strike with the hammer head 112. When the key 1g is released, the key 1g returns to the rest position, and the damper spoon 131 leaves the damper lever 131. As a result, the damper lever 131 presses the damper head 134 against the strings 1d due to the elastic force of the damper spring 132, and absorbs the vibrations of the strings 1d.

Turning back to FIG. 1 of the drawings, the pedal mechanism 1f have at least two pedals 1f' and respective link sub-mechanisms. One of the two pedals 1f' is called as a damper pedal, and allows the strings 1d to prolong the vibrations by holding the damper heads 134 off. The other pedal 1f' is called as a soft pedal, and causes the hammer heads 112 to softly strike the associated strings 1d for lessening the volume.

The controlling system 2 comprises a hammer stopper 2a, a driving unit 2b for changing the hammer stopper 2a between a free position FP and a blocking position BP, a mode shift switch 2c, a sound processing unit shared with the electronic sound generating system 3 and an adjusting mechanism 2d.

Figure 2:
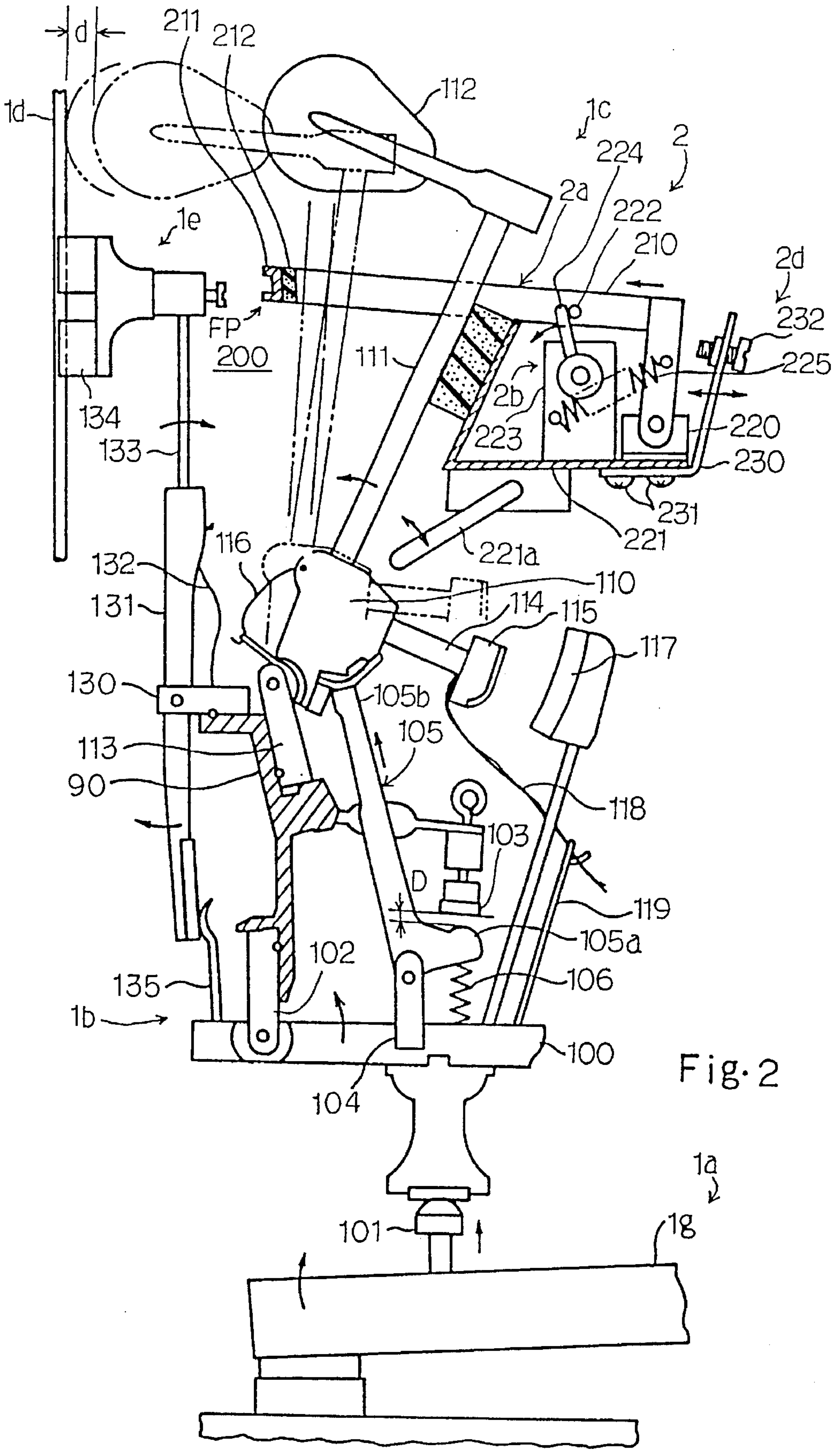
FIG. 2 is a side view showing a key action mechanism, a hammer assembly and a hammer stopper in a free position incorporated in the keyboard musical instrument shown in FIG. 2.

As will be better seen from FIG. 2, the driving mechanism 2b is placed at the back of the hammer assemblies 1c or on the front side of the keyboard musical instrument with respect to the hammer assemblies 1c, and the hammer stopper 2a projects from the driving mechanism 2b into a space 200 between the hammer shanks 11d and the sets of strings 1d.

The hammer stopper 2a has generally L-shape arm members 210, bar members 211 laterally extending in the space 200 and connected between the arm members 210 and cushion members 212 of felt respectively attached to the bar member 211, and the cushion members 212 are assigned to the key action groups, respectively. The cushion members 212 attached to the bar members 211 are small enough to be accommodated in the space 200.

The driving unit 2b comprises bearing units 220 mounted on a hammer rail 221 for rotatably supporting the arm members 210, a pin member 222 implanted into one of the arm members 210, a motor/driver unit 223 mounted on the hammer rail 221 and electrically connected to the sound processing unit and a pusher 224 fixed to a rotational rod of the motor/driver unit 223 and a spring member 225 stretched between the motor/driver unit 223 and the arm member 210. The hammer rail 221 is movable to be closer and spaced from the sets of strings 1d by means of hammer rail hinges 221a functionally connected to the soft pedal 1f'.

When the keyboard musical instrument is in the acoustic mode, the motor/driver unit 223 maintains the pusher 224 in an oblique position, and the spring member 225 urges the arm members 210 to bring the pin member 222 into contact with the pusher 224. As a result, the cushion members 212 are spaced apart from the hammer shanks 111, and are out of the rotating range of the hammer shanks 111. In other words, the hammer stopper 2a is in the free position. The hammer heads 112 rebounds on the strings 1d, and the hammer stopper 2a in the free position does not interrupt the motions of the hammer assemblies 1c.

Figure 3:
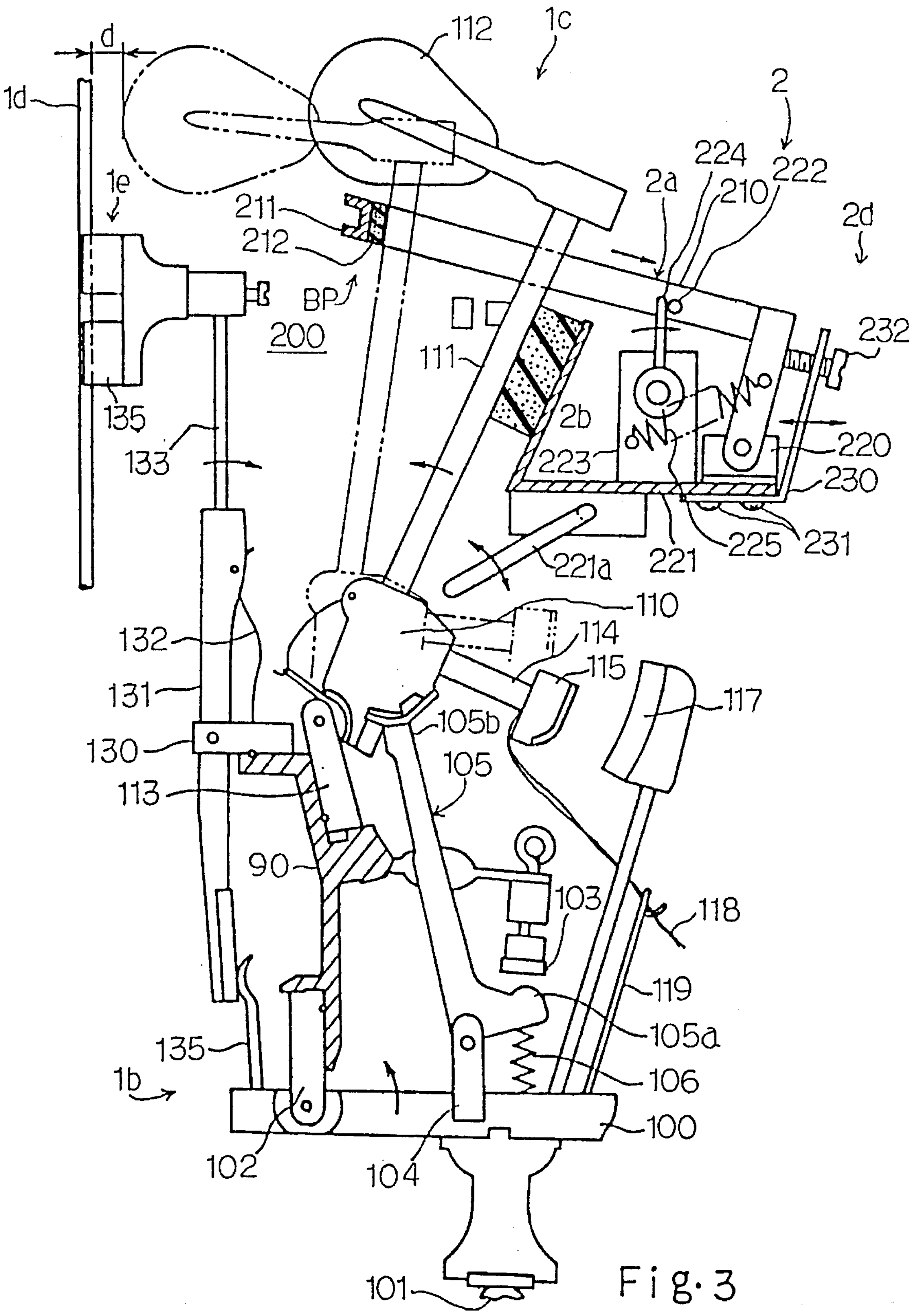
FIG. 3 is a side view showing the key action mechanism, a hammer assembly and a hammer stopper in a blocking position.

On the other hand, when the keyboard musical instrument enters into the electronic sound mode, the motor/driver unit 223 rotates the pusher 224 in the clockwise direction, and the pusher 224 is changed to a vertical position as shown in FIG. 3. The arm member 210 also rotates around the bearing units in the clockwise direction, and the cushion members 212 become closer to the home positions of the hammer assemblies 1c. The hammer stopper 2a enters into the blocking position BP, and the cushion members 212 have the respective upper surfaces allowing the hammer shanks 111 to be in parallel to the hammer shanks 111 at the strikes therebetween. The hammer shanks 111 rebound on the cushion members 212 on the way to the sets of strings 1d, and the hammer stopper 2a prevents the strings 1d from vibrations. The cushion members 212 receive the hammer shanks 111 at respective portions closer to the hammer heads 112 rather than the hammer butts 110, and the hammer shanks 111 are not deformed at the impacts with the hammer stopper 2a. For this reason, the hammer heads 112 do not move ahead toward the strings 1d after the impacts with the hammer stopper 2a, and the hammer stopper 2a is installed without a margin for the deformation of the hammer shanks 111.

The adjusting mechanism 2d comprises a slidable bracket member 230 slidable with respect to the hammer rail 221, bolts 231 fixing the bracket member 230 to the hammer rail 221 and a regulating bolt 232 screwed through the bracket member 230. Although the arm member 210 in the free position FP is spaced from the screw 232 (see FIG. 2), the screw 232 is in contact with the arm member 210 in the blocking position BP, and defines the rebounding points of the hammer assemblies 1*c* 212 in the space 200. Using the slidable bracket member 230, the manufacturer roughly regulates the rebounding point, and, thereafter, the screw 232 exactly defines the rebounding points. As described hereinbefore, the hammer assemblies 1*c* do not require a margin, and the adjusting mechanism 2*d* allows the manufacturer to exactly adjust the rebounding points. For this reason, the manufacturer can exactly set the escape of the jacks 105 to appropriate points without a margin, and the escape points become as close as those of a corresponding standard upright piano. This results in that the keyboard musical instrument constantly gives the unique key touch to the player regardless of the hammer stopper 2*a*.

In a standard upright piano, the space in front of the hammer assemblies 1*c* is much wider than the space 200 at the back of the hammer assemblies 1*c* on the opposite side to the space 200. The driving unit 2*b* and the adjusting mechanism 2*d* are larger in volume than the cushion members 212 attached to the bar members 211. Therefore, it is reasonable to assign the narrow space 200 and the wide space to the bar members/cushion members 211 and 212 and the driver unit/adjusting mechanism 2*b* and 2*d*, respectively, because the manufacturer can constitute the driver unit 2*b* and the adjusting mechanism 2*d* by using standard parts. This results in reduction in cost.

Turning back to FIG. 1 of the drawings, the electronic sound generating system 3 largely comprises a sound processing unit 3*a*, a plurality of key sensors 3*b* connected to the sound processing unit 3*a*, a pedal sensor 3*c* associated with the damper pedal 1*f* and also connected to the sound processing unit 3*a*, an amplifier unit 3*d* associated with the sound processing unit 3*a*, a speaker system 3*e* housed in a speaker box 3*f* and connected to the amplifier unit 3*d*, a socket unit 3*g* also connected to the amplifier unit 3*d* and a headphone 3*h* detachable from the socket unit 3*g*. In this instance, the keyboard musical instrument is equipped with both of the speaker system 3*e* and the headphone 3*g*. However, only the headphone 3*h* may be incorporated in the electronic sound generating system 3 in another implementation.

The key sensors 3*b* are respectively associated with the plurality of black and white keys 1*g*, and each of the key sensors 3*b* comprises a shutter plate 3*i* fixed to the bottom surface of the associated key 1*g* and a photo-interrupter 3*j* for monitoring the motion of the shutter plate 3*i*. Four different slit patterns are formed in the shutter plate 3*i*, and the four slit patterns sequentially pass through an optical path produced by the photo interrupter 3*j*. The photo interrupter 3*j* produces a digital signal variable with the slit pattern passing through the optical path, and supplies the digital signal to the sound processing unit 3*a*. The sound processing unit 3*a* determines the key velocity and estimates the time when the associated hammer head 112 strikes the strings 1*d*.

The pedal sensor 3*c* monitors the damper pedal 1*f* to see whether or not the player steps on it. If the player steps on the damper pedal 1*f*, the pedal sensor 3*c* detects the current position of the damper pedal 1*f*, and reports the current position to the sound processing unit 3*a*.

Figure 4:
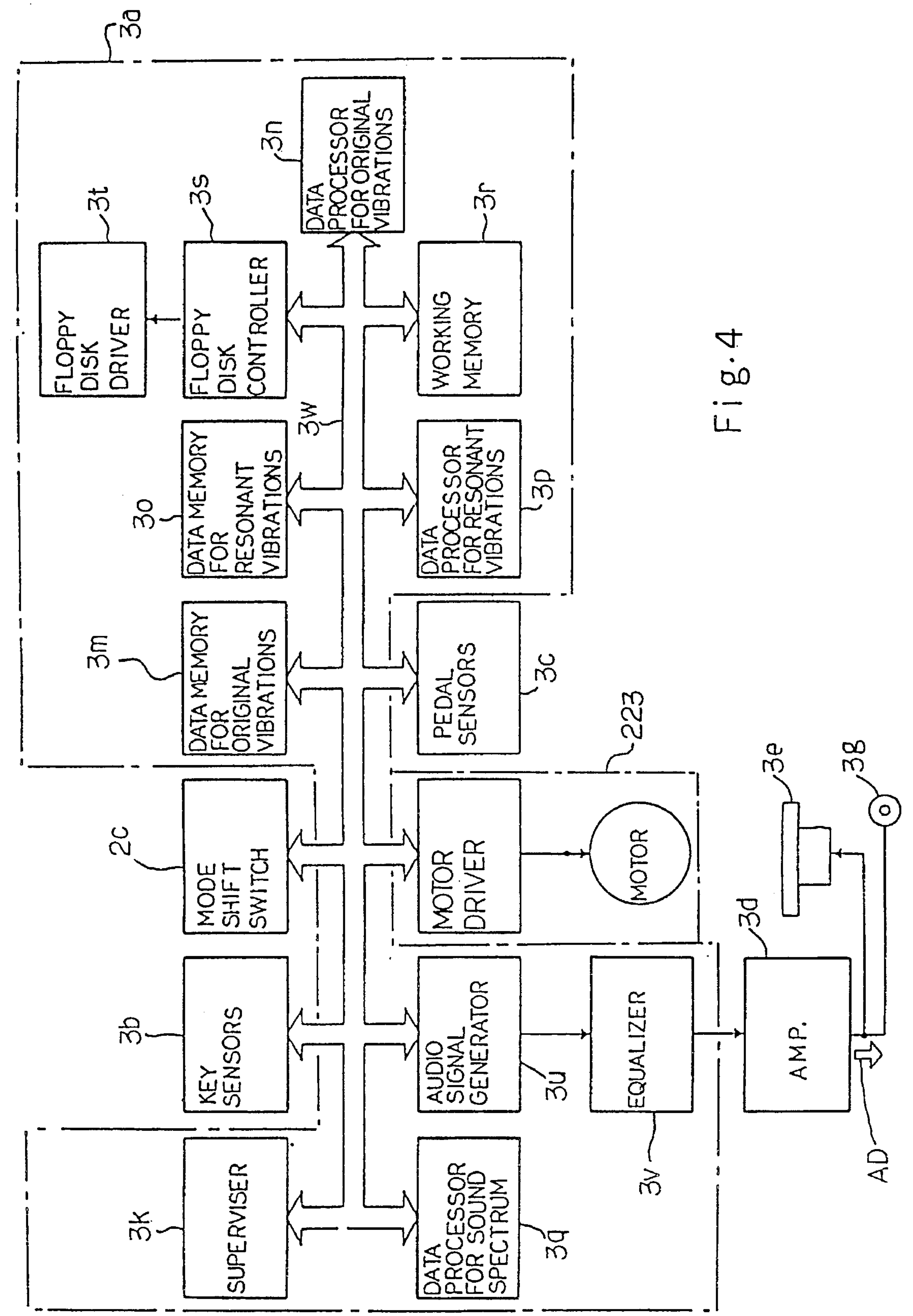
FIG. 4 is a block diagram showing the circuit arrangement of a sound processing system incorporated in the keyboard musical instrument.

The sound processing unit 3*a* is arranged as shown in FIG. 4 of the drawings, and comprises a supervisor 3*k*, a data memory 3*m* for original vibrations, a data processor 3*n* for original vibrations, a data memory 3*o* for resonant vibrations, a data processor 3*p* for resonant vibrations, a data processor 3*q* for sound spectrum, a working memory 3*r*, a floppy disk controller 3*s*, a floppy disk driver 3*t*, an audio signal generator 3*u*, an equalizer 3*v* and a bus system 3*w*. In this instance, the data memories 3*m* and 3*o* are implemented by non-volatile memory devices such as, for example, read only memory devices, and random access memory devices serve as the working memory 3*r*.

The supervisor 3*k* sequentially scans signal input ports assigned to a mode control signal supplied from the mode shift switch 2*c*, the digital signals from the key sensors 3*b* and the detecting signal from the pedal sensor 3*c*, and supervises the other components 3*m* to 3*u* for controlling the electric motor/driver unit 223 and producing an audio signal AD. An internal table is incorporated in the supervisor 3*k*, and the internal table defines relation between the key numbers respectively assigned to the back and white keys 1*g*, key velocity and timings for producing the audio signal AD. The audio signal AD is supplied from the equalizer 3*v* to the amplifier unit 3*d*, and the audio signal AD is distributed to the speaker system 3*e* and the socket unit 3*g* for producing electronic sounds after the amplification of the audio signal AD.

The data memory 3*m* for original vibrations stores a plurality sets of pcm (Pulse Code Modulation ) data codes indicative of frequency specular of original vibrations on the strings 1*d*, and each set of pcm data codes is corresponding to one of the keys 1*g*. A plurality groups of pcm data codes form a set of pcm data codes, and are corresponding to frequency specular at different intensities or hammer speeds. In general, if a hammer head 112 strongly strikes the associated string 1*d*, higher harmonics are emphasized. The plurality sets of pcm data codes are produced with a sampler (not shown) through sampling actual vibrations on the respective strings 1*d* at an appropriate frequency. The set of pcm data codes may be produced by means of the data processor 3*q* through a real-time manner. Using a group of pcm data codes, original vibrations produced upon depressing a key 1*g* are restored, and the supervisor 3*k* controls the sequential access to a group of pcm data codes stored in the data memory 3*m*.

The data processor 3*n* for original vibrations is provided in association with the data memory 3*m*, and modifies a group of pcm data codes for an intermediate hammer speed. The modification with the data processor 3*n* is also controlled by the supervisor 3*k*.

The data memory 3*o* for resonant vibrations stores a plurality sets of pcm data codes indicative of resonant vibrations, and the resonant vibrations take place under stepping on the damper pedal.

While a player steps on the damper pedal 1*f* of the upright piano 1 in the acoustic sound mode, dampers heads 135 are held off, and some of the strings 1*d* are resonant with the strings struck by a hammer head 112. The resonant tones range −10 dB and −20 dB with respect to the tone originally produced through striking with the hammer head 112, and time delay of several millisecond to hundreds millisecond is introduced between the originally produced sound and the resonant tones. If the player continuously steps on the damper pedal 1*f*, the resonant tones continues several seconds. The player can rapidly terminate the original and resonant tones by releasing the damper pedal 1*f*.

The electronic sound generating system 3 can impart the same effect to the electronic sounds, and the pcm data codes stored in the memory 3*o* are used for producing the resonant tones. Namely, the audio signal generator 3u is responsive to the detecting signal of the pedal sensor 3c, and the supervisor 3k allows the pcm data codes to be sequentially fetched by the data processor 3p. The pcm data codes stored in the data memory 3o are indicative of frequency specular of the resonant vibrations, and are also produced by means of the sampler or the data processor 3p for resonant vibrations. Each set of pcm data codes is corresponding to one of the depressed keys 1g, and is constituted by six groups of pcm data codes at the maximum. Each group of pcm data codes is corresponding to one of the resonant strings 1d, and the second harmonic to the sixth harmonic are taken into account for strings one octave higher than low-pitched sounds. However, if the depressed key 1g is lower than the thirteenth key from the lowest key in the eighty-eight key keyboard, the string one octave lower than the depressed key should be taken into account. In general, seventy-one damper mechanisms are incorporated in a piano. However, another piano may have sixty-six damper mechanisms or sixty-nine damper mechanisms. As described hereinbefore, the intensity of frequency spectrum is corresponding to the hammer speed, and the intensities are variable with the type and model of the piano.

A set of pcm data codes are sequentially read out from the data memory 3o depending upon the depressed key 1g under the control of the supervisor 3k, and the data processor 3p for resonant vibrations modifies the pcm data codes for an intermediate intensity. The memory capacity of the data memory 3o may be large enough to store the pcm data codes at all of the detectable hammer speeds, and the data processor 3p may calculate each set of pcm data codes on the basis of parameters stored in the data memory 3o.

The data processor 3q for sound spectrum can produce the group of pcm data codes indicative of frequency spectrum for original vibrations and the set of pcm data codes indicative of frequency specular for resonant vibrations as described hereinbefore. The data processor 3q is further operative to cause the frequency specular to decay.

In detail, when a player releases a key of a piano, original vibrations on a string rapidly decays, because an associated damper mechanism 1e returns to contact with the vibrating strings 1d again. The data processor 3q simulates the decay, and sequentially decreases the values of the pcm data codes. The resonant tones continue for several seconds insofar as the player keeps the damper pedal 1f in the depressed state. However, if the player releases the damper pedal 1f, the resonant tones are rapidly decayed. The data processor 3q also simulates the decay, and sequentially decreases the values of the pcm data codes for the resonant vibrations.

The decay is not constant. If the player releases the damper pedal through a half pedal, the tones decay at lower speed rather than the ordinary release. Moreover, some players use the half pedal in such a manner as to retard low-pitched tones rather than high-pitched tones, and such a pedal manipulation is called as an oblique contact. On the contrary, if the damper pedal causes all the damper mechanisms to be simultaneously brought into contact with the strings 1d, the damper manipulation is referred to as simultaneous contact. The data processor 3q can simulate the gentle decay upon the release through the half pedal as well as the oblique contact, and the values of the pcm data codes are decreased at either high, standard or low speed in the simultaneous contact and at different speed in the oblique contact. The data processor 3q may change the ratio between the fundamental tone and the harmonics thereof for the half pedal and decay high-order harmonics faster than the fundamental tone. The frame of a piano usually vibrates, and the frame noises participate the piano sound. The data processor 3q may take these secondary noises into account and modify the frequency ratio.

The audio signal generator 3u comprises a digital filter, a digital-to-analog converter and a low-pass filter, and produces an analog audio signal from the pcm data codes supplied from the data memories 3m and 3o and/ or the data processors 3n, 3p and 3q. The pcm data codes are subjected to a digital filtering, and are, then, converted into the analog audio signal. In the digital filtering, the vibration characteristics of the speaker system 3e and vibration characteristics of the speaker box 3f are taken into account, and the pcm data codes are modified in such a manner that the frequency spectrum of produced sounds becomes flat. The digital filter is of the FIR type in this instance. However, an IIR type digital filter is available. An oversampling type digital filter may follow the digital filtering for eliminating quantized noises.

After the digital filtering, the digital-to-analog converter produces the analog audio signal, and the analog audio signal is filtered by the low-pass filter, and the low-pass filter is of a Butterworth type for improving group delay. The analog audio signal AD thus filtered is supplied through the equalizer 3v to the amplifier unit 3d, and the amplifier unit 3d amplifies the analog audio signal AD for driving the speaker system 3e and/or the headphone 3h.

The floppy disk driver 3t reads out data codes formatted in accordance with the MIDI standards from a floppy disk under the control of the floppy disk controller 3s, and the supervisor 3k allows the audio signal generator 3u to reproduce sounds from the data codes read out from the floppy disk. A music can be reproduced in the timbre of another musical instrument such as, for example, a pipeorgan, a harpsichord or a wind musical instrument.

The supervisor 3k may format the detecting signals of the key sensors 3b and the detecting signal of the pedal sensor 3c in accordance with the MIDI standards, and the MIDI codes are stored in a floppy disk under the control of the floppy disk controller 3s. If the keyboard instrument can record and reproduce a performance, the keyboard instrument has the recording mode and the playback mode.

Assuming now that a player wants to perform a music in the electronic sound mode, the player manipulates the mode shift switch, and the superviser 3k acknowledges the mode change. The superviser 3k instructs the motor/driver unit 223 to change the pusher 224 from the oblique position shown in FIG. 2 to the vertical position shown in FIG. 3. The rotation of the pusher 224 is transferred through the pin 222 to the arm member 210, and the arm member 210 rotates in the clockwise direction until contact with the screw 232. The cushion members 212 become closer to the hammer rail 221, and the stopper 2a enters into the blocking position.

After the entry into the blocking position, the player selectively depresses the black and white keys 1 *g*, and the key action mechanisms 1b sequentially drive the associated hammer assemblies 1c for rotation. The jacks 105 exactly escape the associated hammer butts 110 at the predetermined distance d, and the give the key touch to the player. Each hammer assembly 1c rebounds on the hammer stopper 2a before striking the associated set of strings 1d, and the strings 1d never vibrate.

On the other hand, the key sensors 3b monitor the associated black and white keys 1g, and produce the digital code signals indicative of the motions of the depressed keys. The pedal sensor 3c also monitors the damper pedal 1f, and produces the detecting signal. These signals are supplied to the input ports of the sound processing unit 3a, and the supervisor 3*k* fetches the data represented by the signals for processing the audio signal AD. The audio signal AD is supplied from the audio signal generator 3*u* through the equalizer 3*v* and the amplifier 3*d* to the speaker system 3*e* and/or the headphone 3*h*, and the speaker system 3*e* and/or the headphone 3*h* produces the electronic sounds with the notes identical with those of the depressed keys 1*g*. Thus, the player confirms the performance through the speaker 3*e* or the headphone in small volume, and practices the performance without disturbing neighborhood.

If the player wants to perform a music in the acoustic sound mode, the player manipulates the mode shift switch 2*c* again, and the superviser 3*k* instructs the motor/driver unit 223 to rotate the pusher 224 from the vertical position to the oblique position, and the cushion members 212 is spaced from the hammer shanks 111. Then, the hammer stopper 2*a* enters into the free position FP, and the hammer heads 112 are allowed to strike the associated sets of strings 1*d*.

After the entry into the free position FP, the key action mechanisms actuated by depressed keys 1*g* drive the hammer assemblies 1*c* for rotation, and the jacks 105 escape from the hammer butts 110 at the predetermined distance d for giving the same key touch as the electronic sound mode. The hammer heads 112 strike the associated sets of strings 1*d* without interruption by the hammer stopper 2*a*, and the strings 1*d* vibrate for producing the acoustic sound with the notes identical with those of the depressed keys 1*g*.

As will be appreciated from the foregoing description, only the bar members 211 and the cushion members 212 extend in the narrow space 200, and the massive driver unit/ the adjusting mechanism 2*b* and 2*d* are retained in the wide space in front of the hammer assemblies 1*c*. Therefore, standard parts are available for the drier unit/ the adjusting mechanism 2*b* and 2*d*, and reduces the production cost of the keyboard musical instrument.

Moreover, the adjusting mechanism 2*d* allows a worker to strictly adjust the blocking position of the hammer stopper 2*a* to a designed point, and no margin is required for the escape between the jacks 105 and the hammer butts 110.

Additionally, the cushion members 212 cause the hammer assemblies 1*c* to rebound thereon at portions closer to the hammer heads 112 rather than the hammer butts 110. The hammer heads 112 do not move ahead after the impacts against the cushion members 212, because the hammer shanks 111 between the rebounding points and the hammer heads 112 are too short to be widely deformed. Therefore, the escaping points are adjustable as close as the escaping points of a standard upright piano, and the key touch is ordinary for the player.

Second Embodiment

Figure 5:
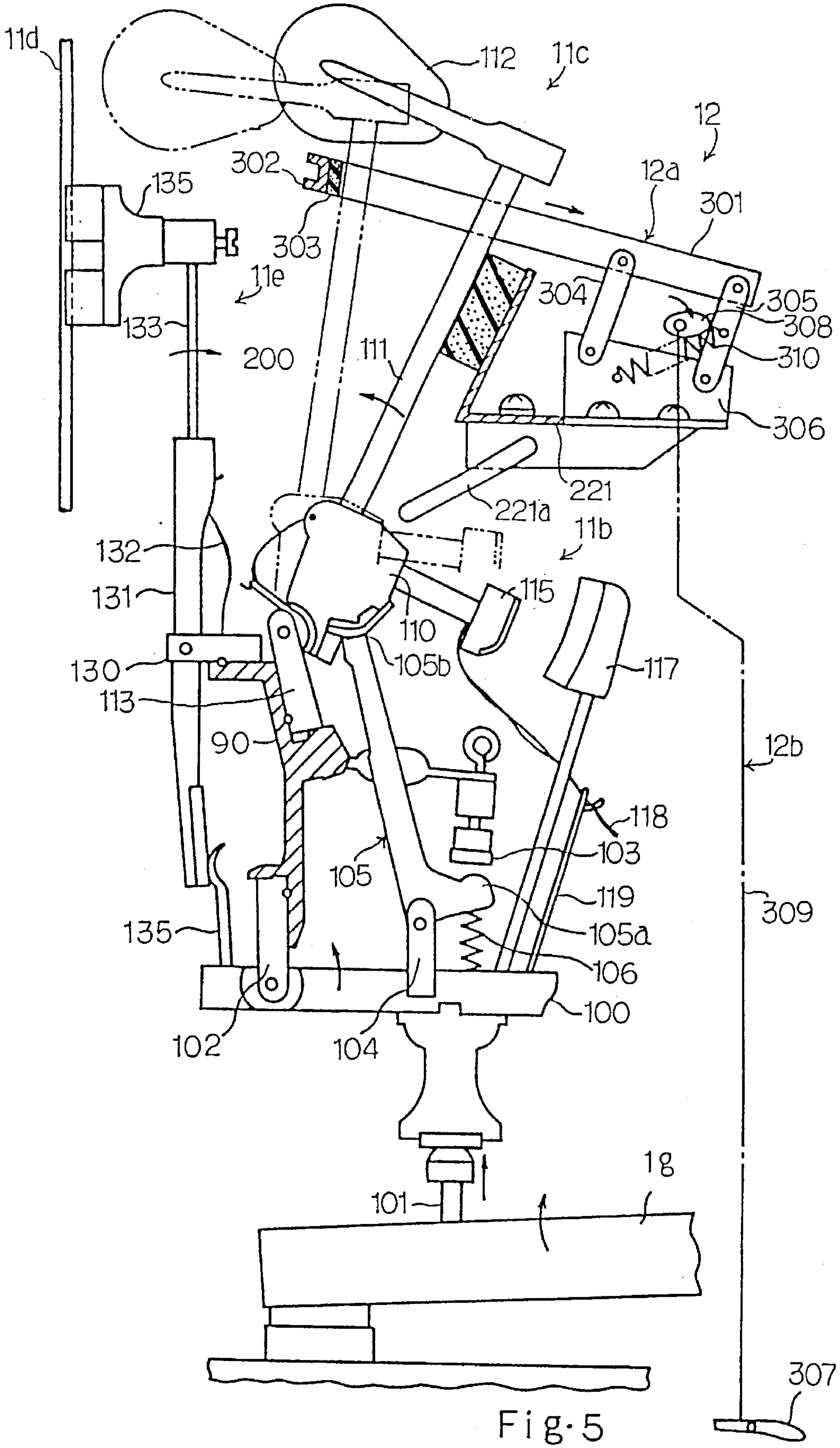
FIG. 5 is a side view showing a controlling system incorporated in another keyboard musical instrument according to the present invention.

FIG. 5 illustrates a key action mechanism 11*b*, a hammer mechanism 11*c*, a set of strings 11*d* and a damper mechanism 11*e* together with a hammer stopper 12*a* and a driving mechanism 12*b*, and they form parts of another keyboard musical instrument embodying the present invention together with an electronic sound generating system. The keyboard musical instrument implementing the second embodiment is similar to the first embodiment except for the hammer stopper 12*a* and the driving mechanism 12*b*, and, for this reason, the members and the parts of the second embodiment are labeled with references designating the corresponding members and parts of the first embodiment.

The hammer stopper 12*a* and the driving mechanism 12*b* form in combination a controlling system 12.

The hammer stopper 12*a* comprises straight arm members 301, bar members 302 connected between the straight arm members 301, cushion members 303 attached to the inner surfaces of the bar members 302, link members 304 and 305 rotatably connected to the straight arm members 301 and bracket members 306 fixed to the hammer rail 221 and rotatably connected to the other ends of the link members 304 and 305. The hammer stopper 12*a* thus arranged is shiftable between the free position closer to the set of strings 11*d* and the blocking position closer to the hammer rail 221.

The driving mechanism 12*b* comprises a pedal 307 turnably connected to the upright piano 1, a cam member 308 rotatably supported by the bracket member 306, a series of links 309 connected between the pedal 307 and the cam member 308 and a return spring 310 stretched between the link member 305 and the bracket member 306. The pedal 307 and the series of links 309 are replaceable with a grip and a flexible cord.

When a player steps on the pedal 307, the cam member 308 pushes the link member 305 against the elastic force of the return spring 310, and the link members 304 and 305 rotate in the clockwise direction. Then, the cushion members 303 become closer to the hammer rail 221, and the hammer stopper 12*a* enters in the blocking position BP as shown in FIG. 5.

On the other hand, if the pedal 307 is released, the cam member 308 allows the return spring 310 to rotate the link members 304 and 305 in the counter clockwise direction, and the cushion members 303 become spaced from the hammer rail 221. Then, the hammer stopper 12*a* enters into the free position FP, and the hammer head 112 strikes the strings without interruption of the hammer stopper 12*a*.

The upright piano and the electronic sound generating system of the second embodiment behave as similar to those of the first embodiment in the acoustic sound mode and the electronic sound mode, and no further description is incorporated hereinbelow for avoiding repetition.

The narrow space 200 is assigned to the bar members/ cushion members 302 and 303, and the driving mechanism 12*b* is positioned in the wide space on the opposite side to the narrow space 200. Therefore, the driving mechanism 12*b* can be fabricated from standard parts, and the production cost is decreased.

Moreover, the cushion members 303 cause the hammer assemblies 11*c* to rebound thereon at portions closer to the hammer heads 112 rather than the hammer butts 110. The hammer heads 112 do not move ahead after the impact on the cushion members 303, because the hammer shanks 111 between the rebounding points and the hammer heads 112 are too short to be widely deformed. Therefore, the escaping points are adjustable as close as the escaping points of a standard upright piano, and the key touch is ordinary for the player.

The driving mechanism 12*b* is economical and durable rather than the driving unit 2*b*.

Third Embodiment

Figure 6:
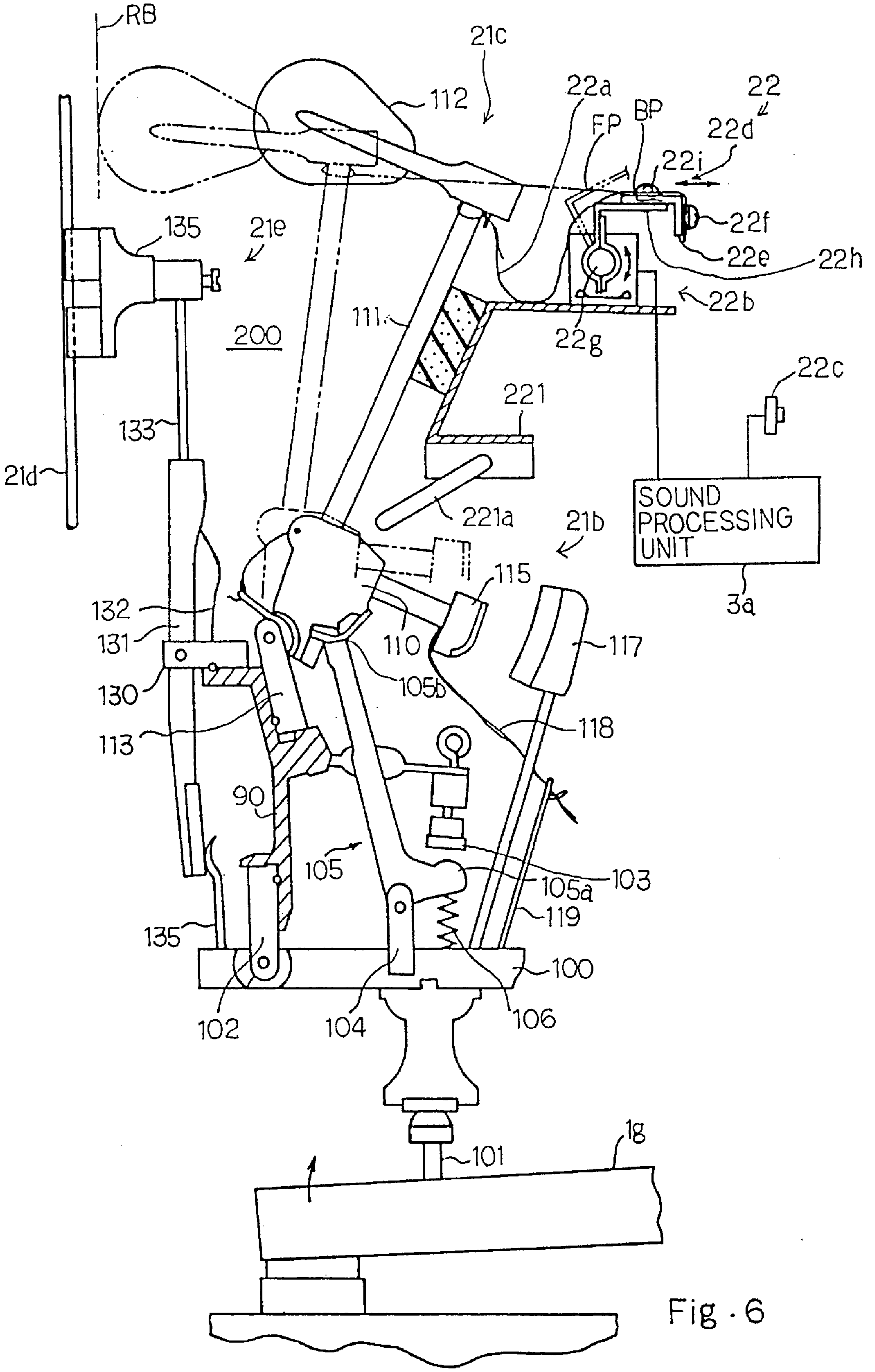
FIG. 6 is a side view showing a controlling system incorporated in yet another keyboard musical instrument according to the present invention.

FIG. 6 illustrates a key action mechanism 21*b*, a hammer mechanism 2 1*c*, a set of strings 21*d* and a damper mechanism 21*e* of an upright piano together with a controlling system 22, and the upright piano and the controlling system 22 form parts of yet another keyboard musical instrument embodying the present invention together with an electronic sound generating system. The keyboard musical instrument implementing the third embodiment is similar to the first embodiment except for the controlling system 22, and, for this reason, the members and the parts of the upright piano and the electronic sound generating system are labeled with references designating the corresponding members and parts of the first embodiment.

The controlling system 22 comprises a hammer stopper implemented by a flexible wire 22*a*, a driving unit 22*b* implemented by an electric motor and a driving circuit, a mode shift switch 22*c* and an adjusting mechanism 22*d*.

The flexible wire 22*a* is connected at one end thereof to an leading end portion of the hammer shank 111 by means of a screw bolt (not shown) and at the other end thereof to a slidable plate member 22*e* by means of a screw bolt 22*f*, and is so long that the hammer assembly 21*c* can rotate toward the set of strings 21*d*.

The driver unit 22*b* and the mode shift switch 22*c* are electrically connected to the sound processing unit 3*a* as similar to those of the first embodiment, and a shaft member 22*g* of the motor is bi-directionally rotatable depending upon the mode of the keyboard musical instrument.

The adjusting mechanism 22*d* comprises a bracket member 22*h* fixed to the shaft member 22*g*, the slidable plate member 22*e* and a bolt 22*i* fixing the slidable plate member 22*e* to the bracket member 22*h*. A tuning worker loosens the bolt 22*i*, and regulates the rebounding point RB of the hammer assembly 21*c*.

When the driver unit 22*b* rotates the shaft member 22*g* in the counter clockwise direction, the adjusting mechanism 22*d* enters into the free position drawn by dots-and-dash line, and the keyboard musical instrument is changed to the acoustic sound mode.

On the other hand, if the shaft member 22*g* is driven for rotation in the clockwise direction, the adjusting mechanism 22*d* enters into the blocking position drawn by real line, and the keyboard musical instrument is changed to the electronic sound mode.

The behavior of the keyboard musical instrument implementing the third embodiment is similar to the first embodiment, and detailed description is omitted for the sake of simplicity.

The driving unit 22*b* is placed in the wide space in front of the hammer assemblies 21*c*, and the hammer stopper 22*a* is also provided in the wide space. For this reason, even if the space 200 is extremely narrow, the controlling system 22 is installed in the upright piano. If hammer sensors are provided in the narrow space 200 for determining the hammer velocities, the flexible wires 22*a* are not obstacles to the installation of the hammer sensors.

Moreover, the adjusting mechanism 22*d* allows the tuning worker to strictly adjust the rebounding point RB of the hammer stopper 22*a* to a designed point, and no margin is required for the escape between the jacks 105 and the hammer butts 110.

Additionally, the flexible wire 22*a* is tied to the leading end of the hammer shank 111. The hammer heads 112 do not move ahead after reaching the rebounding point RB. This means that a margin is not required for adjusting the distance between the toe 105*a* and the regulating button 103, and the escaping points are adjustable as close as the escaping points of a standard upright piano.

Figure 7:
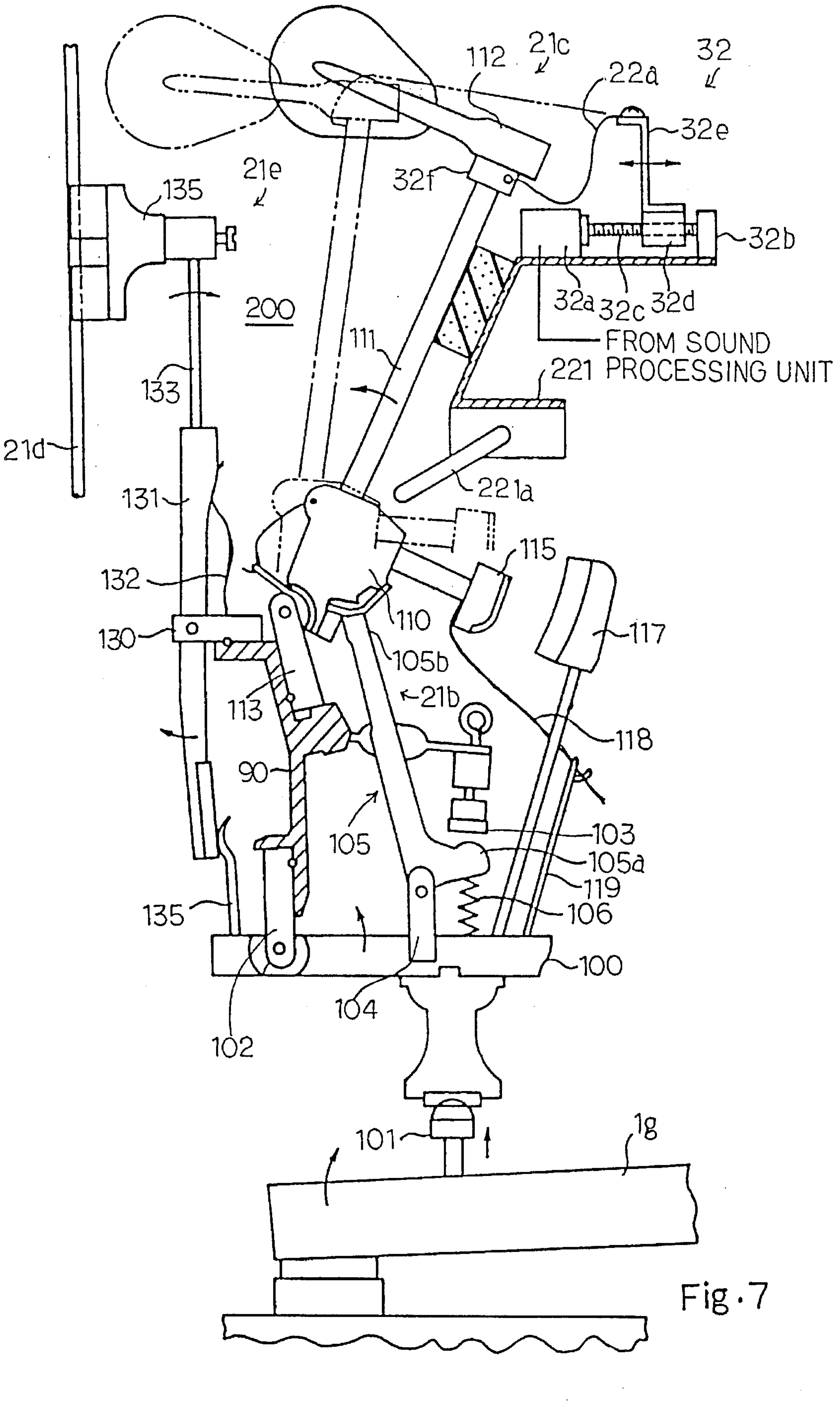
FIG. 7 is a side view showing a first modification of the controlling system shown in FIG. 6.

FIG. 7 shows a first modification of the keyboard musical instrument implementing the third embodiment. The driving unit 32*a* of the controlling system 32 comprises a geared motor/driving circuit 32*a* connected to the sound processing unit 3*a*, a bearing unit 32*b*, a threaded rod 32*c* connected at one end to the geared motor 32*a* and rotatably supported at the other end by the bearing unit 32*b*, a block member 32*d* with a threaded hole engaged with the threaded rod 32*c*, a bracket member 32*e* fixed to the block member 32*d* and connected to the flexible wire 22*a*, a ring member fixed to the leading end of the hammer shank 111 and connected to the other end of the flexible wire 22*a* and a restricting member (not shown) for preventing the bracket member 32*e* from rotation. The geared motor is bi-directionally rotatable, and moves the block member 32*d* forwardly and backwardly for changing the hammer stopper between the free position and the blocking position.

The geared motor is replaceable with a worm and a worm wheel.

Figure 8:
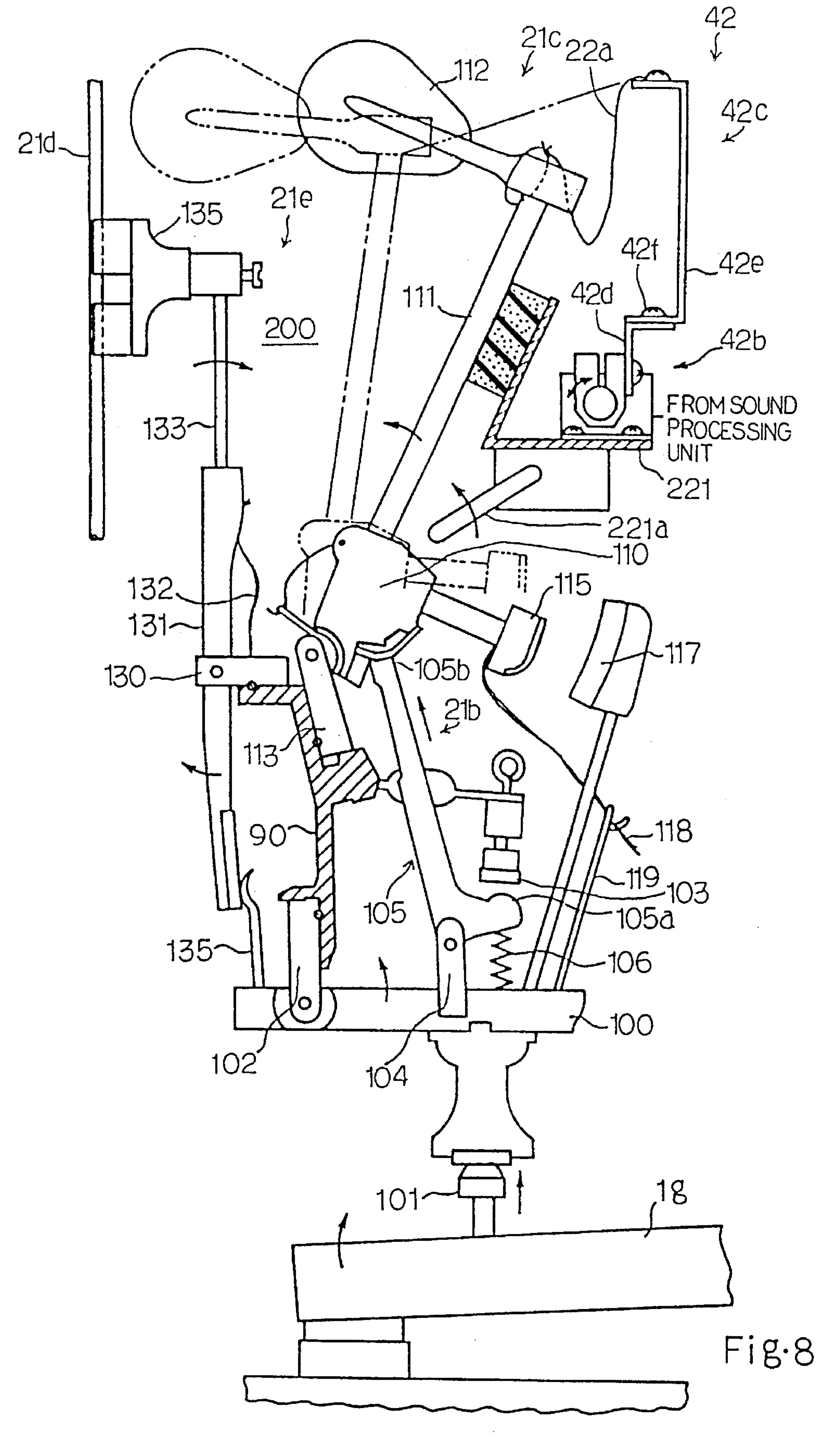
FIG. 8 is a side view showing a second modification of the controlling system.

FIG. 8 shows a second modification of the third embodiment, and a controlling system 42 of the second modification comprises the flexible wire tied to the hammer head 112, a driver unit 42*b* implemented by a motor/driver circuit, a mode shift switch (not shown) and an adjusting mechanism 42*c*. The adjusting mechanism 42*c* has a bracket member 42*d* fixed to a shaft member of the motor, a slidable plate member 42*e* and a bolt member 42*f* for fixing the slidable plate member 42*e* to the bracket member 42*d*. The driver unit 42*b* and the mode shift switch are replaceable with a combination of a grip and a flexible cord or a combination of a pedal and a link mechanism.

Figure 9:
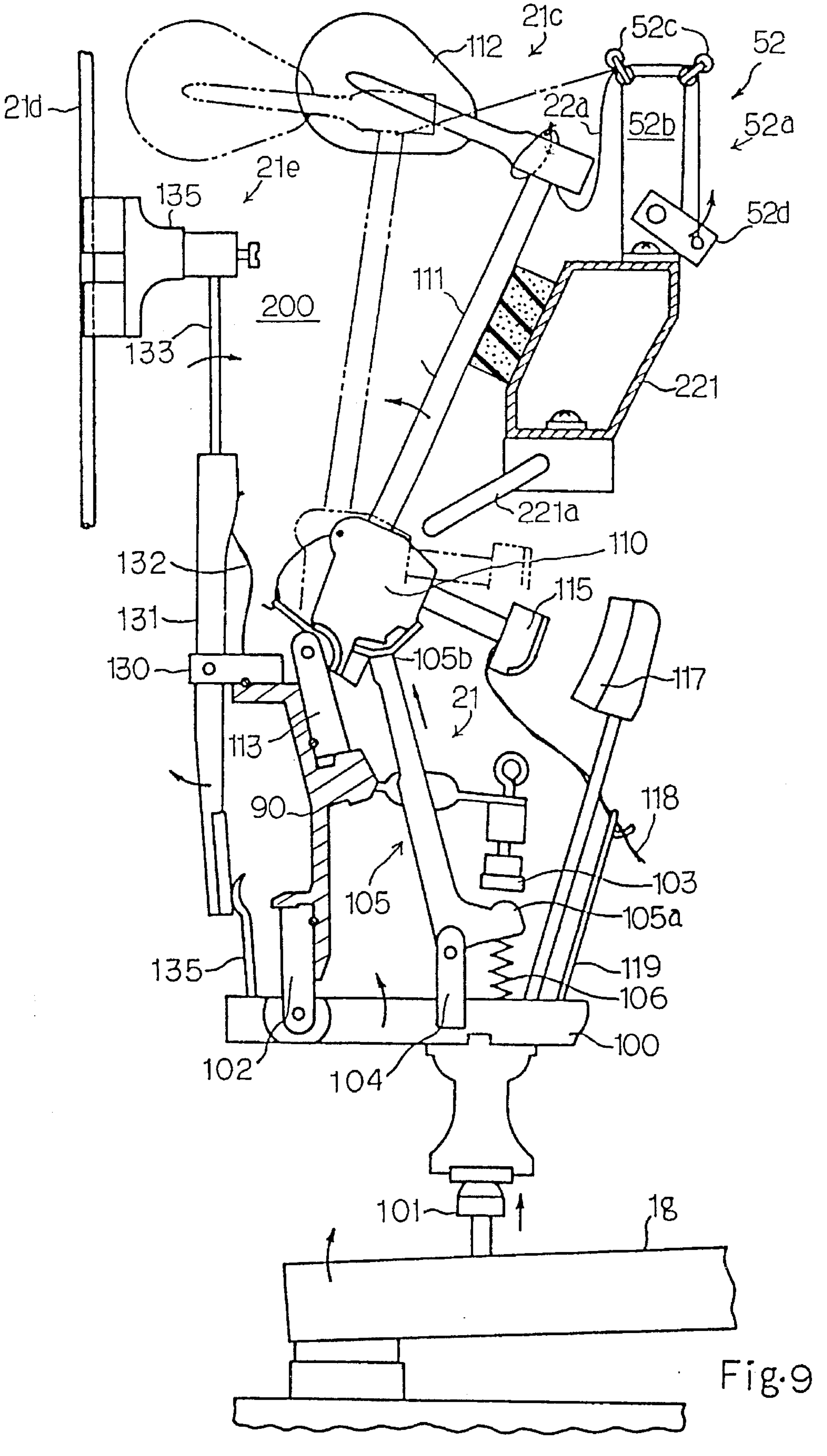
FIG. 9 is a side view showing a third modification of the controlling system.

FIG. 9 shows a third modification of the third embodiment, and a controlling system 52 comprises the flexible wire 22*a* tied to the hammer head 112 and a driver unit 42*a*. The driver unit 52*a* comprises a bracket member 52*b* fixed to the hammer rail 221, guide roller units 52*c*, a rotatable lever 52*d*, a motor/driver circuit (not shown) and a mode shift switch. The flexible wire 22*a* passes through the guide roller units 52*c*, and is anchored to the rotatable lever 52*d*. The motor/driver unit and the mode shift switch are replaceable with a combination of a grip and a flexible cord or a combination of a pedal and a link mechanism.

Figure 10:
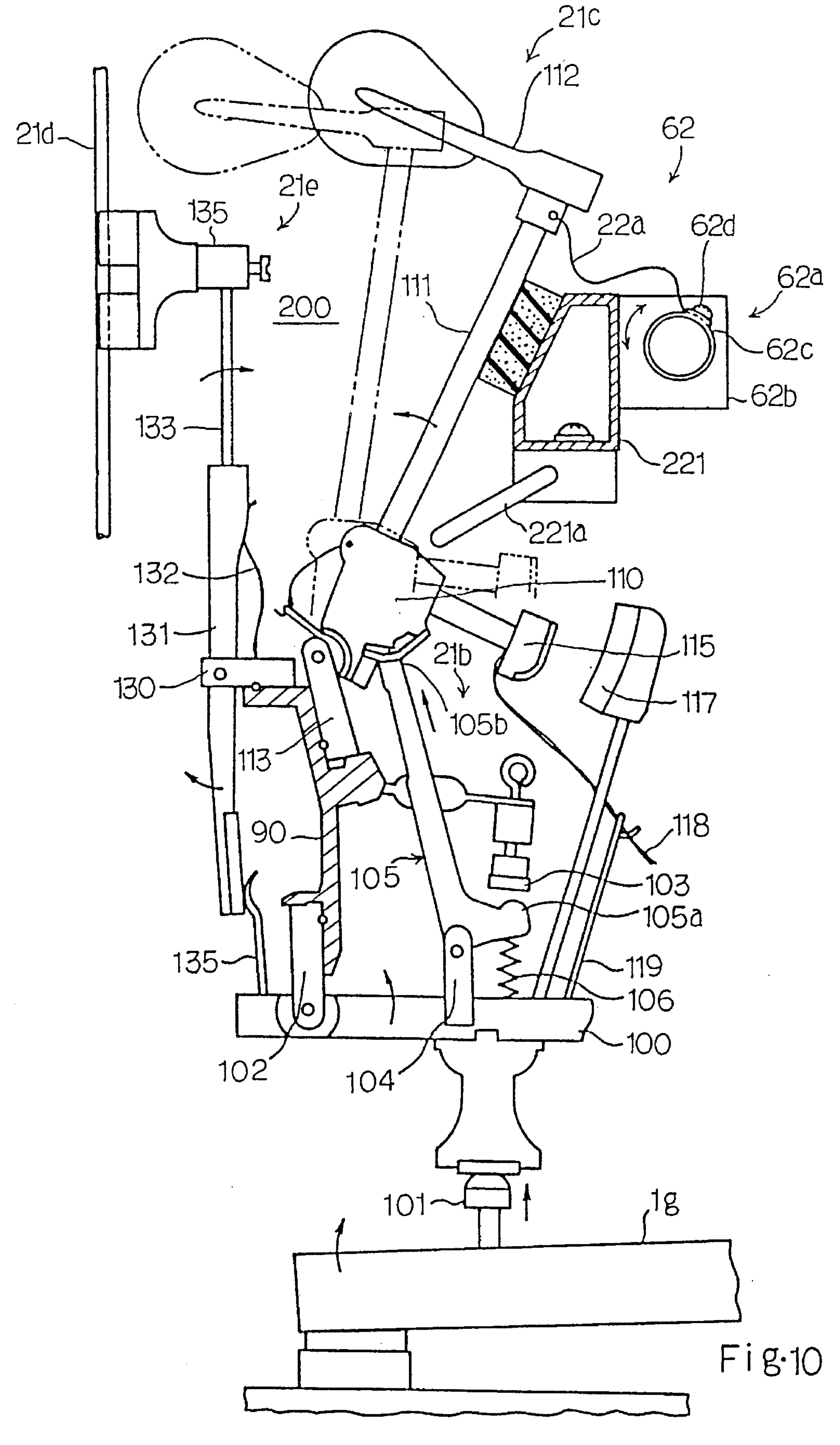
FIG. 10 is a side view showing a fourth modification of the controlling system.

FIG. 10 shows a fourth modification, and a controlling system 62 comprises the flexible wire 22*a* fixed to the leading end of the hammer shank 111 by means of an attachment, a driver unit 62*a* and a mode shift switch (not shown). The driver unit 62*a* has a stationary bracket member 62*b* fixed to the hammer rail 221, a ring member 62*c* rotatably supported by the stationary bracket member 62*b*, a bolt 62*d* fixing the other end of the flexible wire 22*a* to the ring member 62*c* and a motor/driver circuit (not shown). The motor/driver circuit bi-directionally rotates the ring member 62*c* for changing between the free position and the blocking position.

These modifications achieve the advantages of the present invention.

Fourth Embodiment

Figure 11:
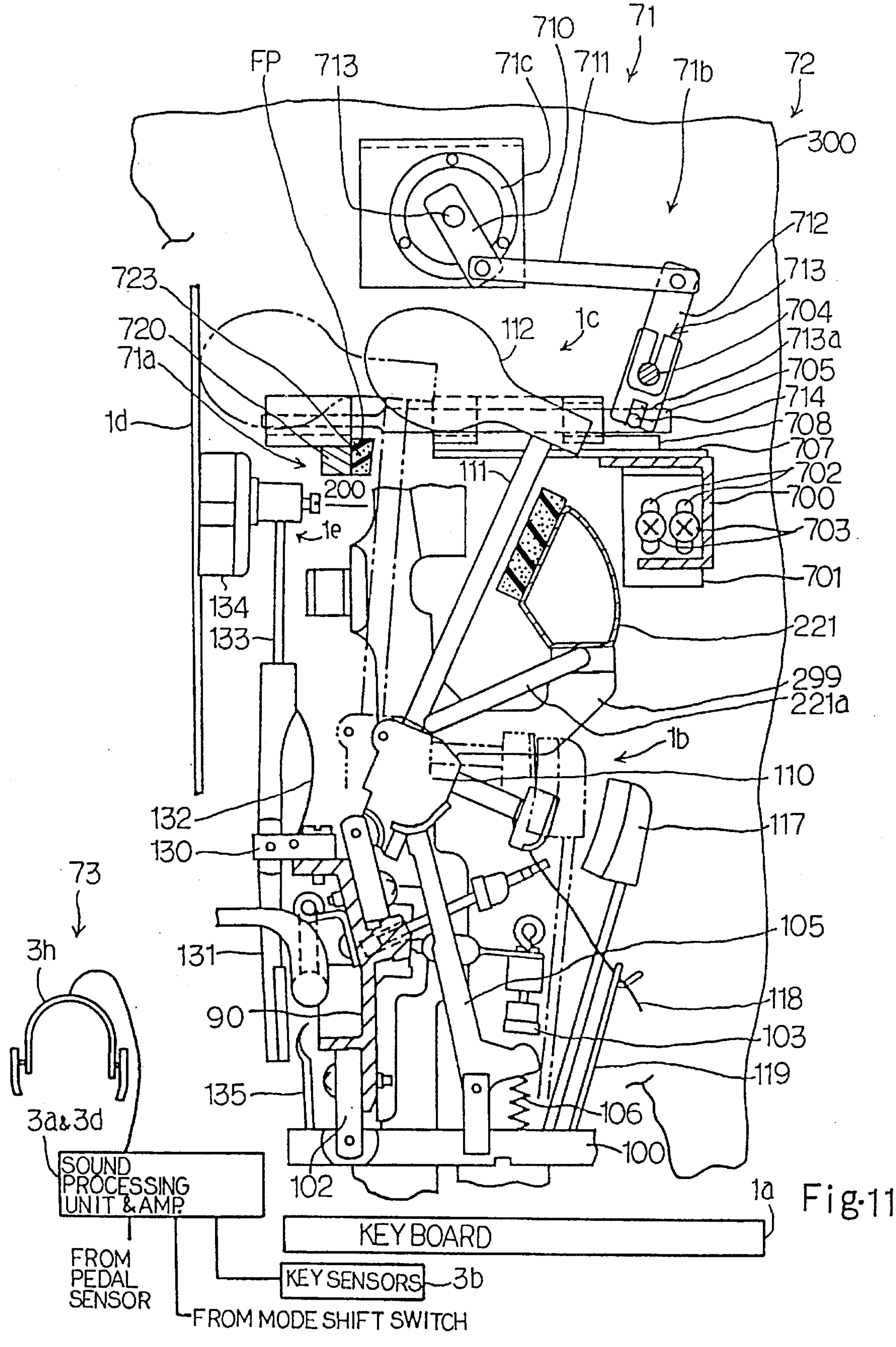
FIG. 11 is a side view showing essential parts of still another keyboard musical instrument according to the present invention.
Figure 12:
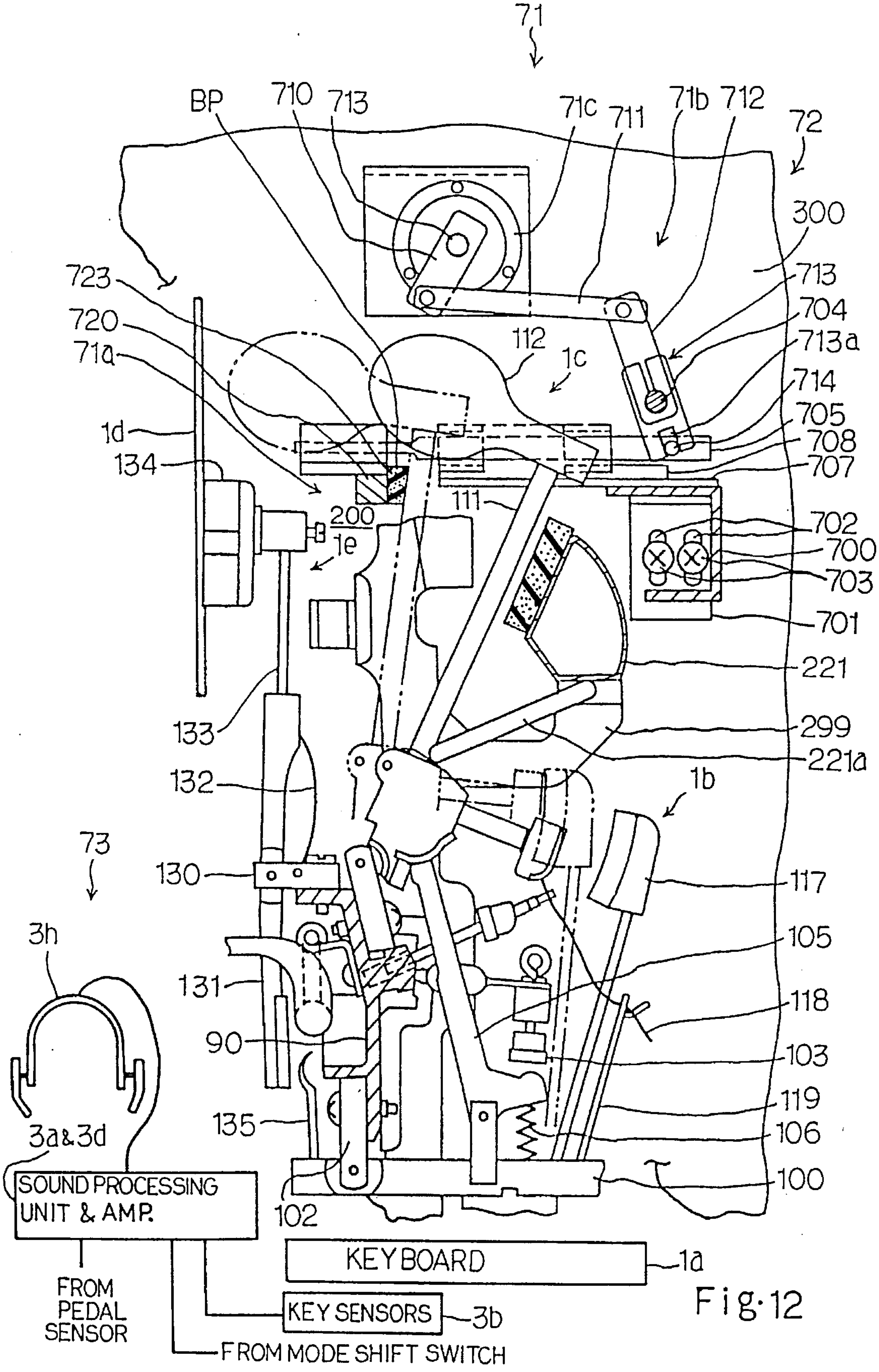
FIG. 12 is a side view showing the essential parts changed to an electronic sound mode.

Turning to FIGS. 11 and 12 of the drawings, a controlling system 71 forms a keyboard musical instrument embodying the present invention together with an upright piano 72 and an electronic sound generating system 73. The upright piano 72 and the electronic sound generating system 73 are similar to those of the first embodiment, and parts and members of the upright piano 72 and the electronic sound generating system 73 are labeled with thé same references as those of the corresponding parts of the first embodiment. In FIGS. 11 and 12, action brackets mounted on a key bed are designated by reference numeral 299, and three to four action brackets 299 are usually incorporated in the upright piano 72 for supporting the center rail 90 and the hammer rail 221.

The controlling system 71 comprises a hammer stopper 71*a* located in the narrow space 200 between the strings 1*d* and the hammer assemblies 1*c*, a drive link mechanism 71*b* supported by a pair of side boards 300 of the upright piano 72, a motor/driver circuit 71*c* supported by one of the side board 300 and a mode shift switch (not shown). The drive link mechanism 71*b* is provided in the wide space on the opposite side of the narrow space 200, and is actuated by the motor/driver circuit 71*c* for changing the hammer stopper 71*a* between the blocking position BP and the free position FP. FIG. 11 shows the hammer stopper 71*a* in the free position FP, and FIG. 12 shows the hammer stopper 71*a* in the blocking position BP. If a player changes the keyboard musical instrument from the acoustic sound mode to the electronic sound mode, the hammer stopper 71*a* is changed from the free position FP to the blocking position BP.

Figure 13:
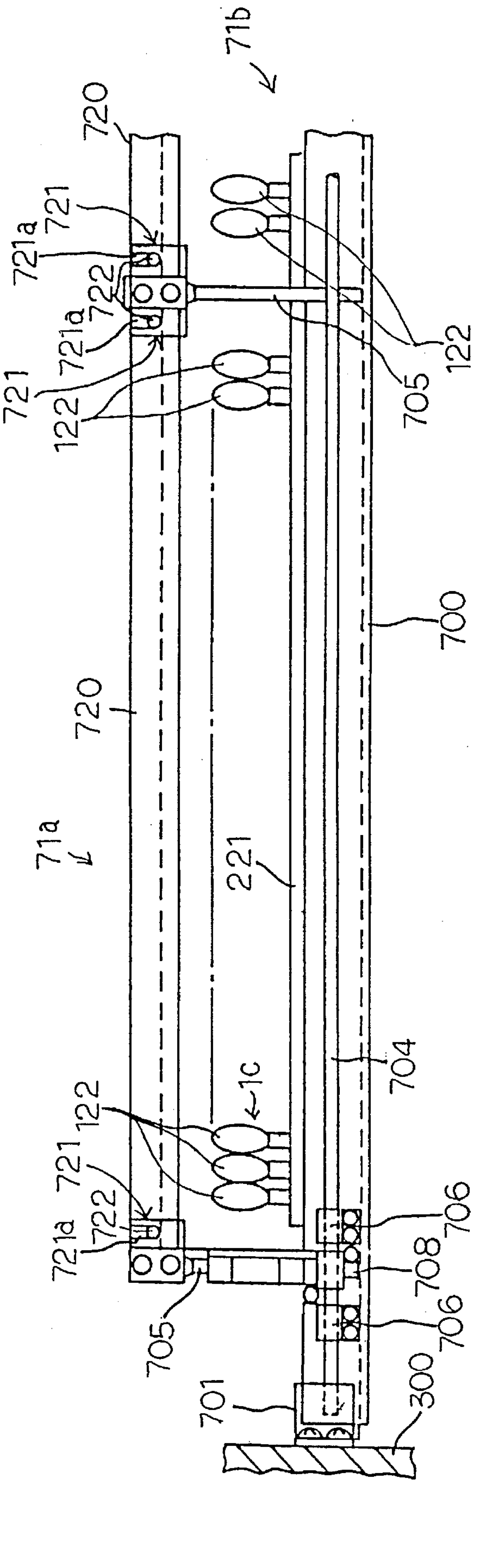
FIG. 13 is a plan view showing a controlling system incorporated in the keyboard musical instrument shown in FIG. 11.

In the following description, FIG. 13 is concurrently referred to for better understanding. The drive link mechanism 71*c* comprises a main beam 700 laterally extending and supported by a pair of bracket members 701, and the pair of bracket members 701 are adjustable in the up-and-down direction of the keyboard musical instrument by sliding elongated holes 702. The pair of bracket members 701 are secured to the side boards 300 by means of screw bolts 703.

The drive link mechanism 71*c* further comprises a drive shaft 704 also laterally extending over the main beam 700 and a plurality of slidable arm members 705 extending in the fore-and-aft direction of the keyboard musical instrument, and the plurality of slidable arm members 705 are spaced at intervals along the drive shaft 704. The drive shaft 704 is rotatably supported by bearing units 706 at both sides thereof and intermediate points thereof, and the bearing units 706 are fixed to the main beam 700. Stays 707 are fixed to the main beam 700 at both sides of the main beam 700, a boundary between a low-pitched tone part of the keyboard 1*a* and a middle-pitched tone part of the keyboard 1*a* and a boundary between the middle pitched tone part and a high-pitched tone part of the keyboard 1*a*. Plain bearings 708 are provided on the stays 707, and the slidable arm members 705 are slidably supported by the plain bearings 708. The hammer stopper 71*a* is connected between the leading ends of the slidable arm members 705.

The drive link mechanism 71*b* further comprises three link members 710, 711 and 712. The link member 710 is fixed to a shaft member 713 of the motor 71*c*, and is rotatably connected at the other end to the link member 711. The link member 711 is also rotatably connected at the other end to the link member 712, and the link member 712 is fixed to the drive shaft member 704. Therefore, the rotation of the shaft member 713 is transferred through the link members 710 to 712 to the drive shaft member 704.

The drive link mechanism 71*b* further comprises a slide lever 713 fixed to the shaft member 704 and a pin member 714 fixed to the slidable arm member 705, and the pin member 714 is engaged with an inner surface of a slit 713*a* formed in the slide lever 713. When the shaft member 704 bi-directionally rotates, the slide lever 713 is swung, and converts the rotation to a reciprocal motion of the slidable arm member 705 and, accordingly, the hammer stopper 71*a* in cooperation with the pin member 713*a*.

The hammer stopper 71*a* comprises a plurality of beam members 720 extending between the slidable arm members 705, a plurality of bracket members 721 with elongated slits 721*a* fixed to the slidable arm members 705, bolt members 722 screwed through the elongated slits 721*a* into the beam members 720 for regulating relative between the beam members 720 and the slidable arm members 705 and cushion members 723 of felt attached to the beam members 720. The cushion members 723 have respective oblique surfaces, and the hammer shanks 111 come into collision with the enter oblique surfaces of the cushion members 723.

Figure 14:
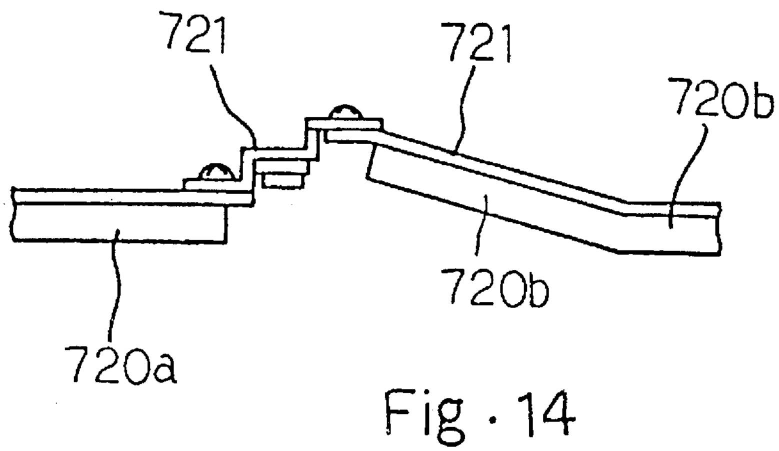
FIG. 14 is a side view showing a hammer stopper incorporated in the controlling system shown in FIG. 13.

As shown in FIG. 14, the beam member 720*a* for the high pitched tone part is different in height from the beam member 720*b* for the middle pitched tone part, because the hammer assemblies 1*c* varies the height.

While the hammer stopper 71*a* is staying in the free position FP in the acoustic sound mode, the hammer shanks 111 do not reach the cushion members 723. However, when the hammer stopper 71*a* enters into the blocking position BP, the hammer shanks 111 rebound on the cushion members 723, and return to the home positions without striking the strings, 1*d*.

Though not shown in the drawings, the mode shift switch is manipulated by a player for changing the keyboard musical instrument between the acoustic sound mode and the electronic sound mode, and the sound processing unit 3*a* instructs the motor/driver circuit 71*c* to rotate the shaft member 704 in either direction. If the player wants to perform a music in the acoustic sound mode, the motor/driver circuit 71*c* rotates the shaft member 713 in the counter clockwise direction, and the link members 710 to 712 cause the shaft member 704 to rotate in the clockwise direction. The slide lever 713 and the pin member 714 converts the rotation of the shaft member 704 into a sliding motion from the right side to the left side on FIG. 11. As a result, the slidable arm members 705 space the hammer stopper 71*a* from the hammer shanks 111, and the hammer stopper 71*a* enters into the free position FP. After the entry into the free position FP, the player can perform a music through a fingering on the keyboard 1*a*, and the key action mechanisms 1*b* sequentially actuate the associated hammer assemblies 1*c* for striking the strings 1*d*. Then, the strings 1*d* vibrate at respective fundamental frequencies, and produce acoustic sounds having the notes identical with the notes of the depressed keys.

On the other hand, if the player changes the keyboard musical instrument to the electronic sound mode through the manipulation of the mode shift switch, the motor/driving circuit 71*c* rotates the shaft member 713 in the clockwise direction, and the link members 710 to 712 rotate the shaft member 704 in the counter clockwise direction. The slide lever 713 and the pin member 713 convert the rotation in the counter clockwise direction into the sliding motion from the left side to the right side. The slidable arm members 705 cause the hammer stopper 71*a* to become closer to the hammer shanks 111, and the hammer stopper 71*a* enters into the blocking position BP. The fingering on the keyboard 1*a* is detected by the key sensors 3*b*, and the sound processing unit 3*a* and the amplifier 3*d* cause the headphone 3*h* to produce the electronic sounds instead of the acoustic sounds.

The controlling system 71 achieves the advantages as similar to the controlling system 2, and is not affected by the soft pedal 1*f'* mistakenly actuated in the electronic sound mode.

Although the damper heads 134 are lowered in the first to third embodiments for preventing them from interference with the hammer stopper 22*a*, the damper heads 134 of the fourth embodiment are as high as a standard upright piano, because the hammer stopper 71*a* is not changed through an angular motion. The damper heads 134 at the standard position effectively take up the vibrations.

Fifth Embodiment

Figure 15:
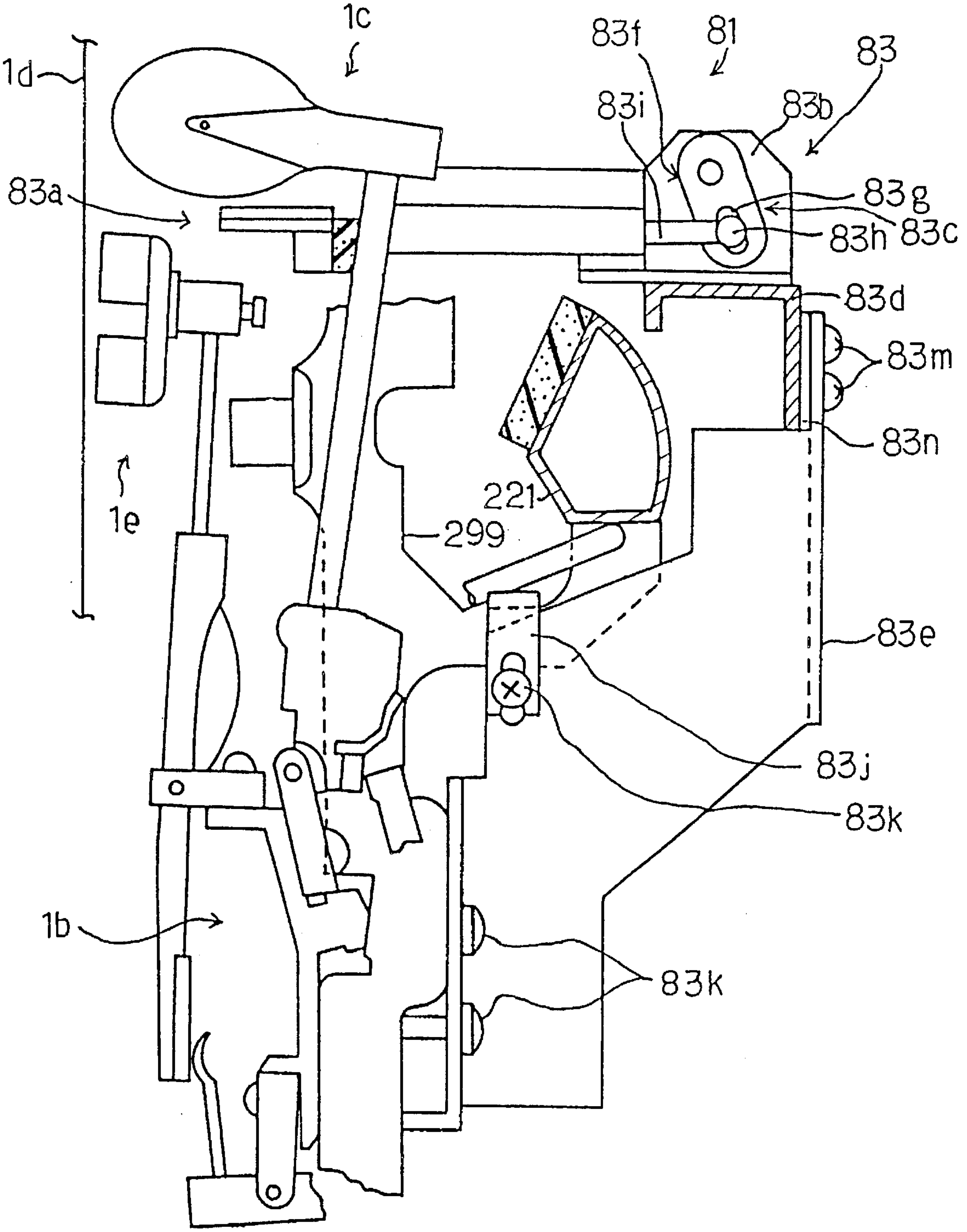
FIG. 15 is a side view showing essential parts of a keyboard musical instrument according to the present invention.
Figure 16:
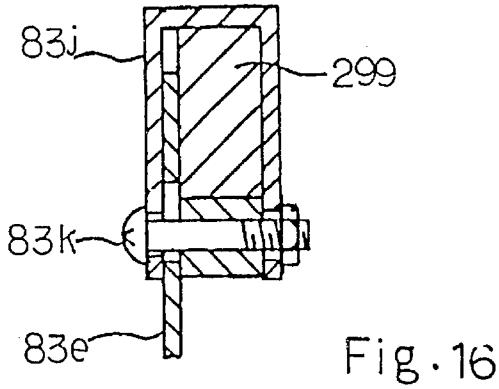
FIG. 16 is a cross sectional view showing an action bracket incorporated in the keyboard musical instrument shown in FIG. 15.

Turning to FIGS. 15 and 16 of the drawings, a keyboard musical instrument embodying the present invention largely comprises an upright piano 81, an electronic sound generating system 82 and a controlling system 83. The upright piano 81 and the electronic sound generating system 82 are similar to those of the first embodiment, and only essential parts are labeled with the same references as those of the fourth embodiment.

The controlling system comprises a hammer stopper 83*a*, a motor/driving circuit 83*b*, a converting mechanism 83*c* from a rotation to a sliding motion and a mode shift switch (not shown). A main beam 83 83*d* is supported through a plurality of bracket member 83*e* by action brackets 299, and the motor/driving circuit 83*b* is mounted on the main beam 83*d*. A lever 83*f* is fixed to a shaft member of the motor, and has an elongated hole 83*g*. A pin member 83*h* is loosely inserted in the elongated hole 83*b*, and is connected to a slidable arm member 83*i*. Plate members 83*j* with slits are fixed to the action brackets 299, and bolts 83*k* secures the bracket members 83*e* to the action brackets 299. For this reason, the bracket members 83*e* and, accordingly, the hammer stopper 83*a* are regulable in the up-and-down direction of the keyboard musical instrument. The main beam 83*d* is regulable in the up-and-down direction by means of elongated holes formed in the main beam 83*d* and bolts 83*m* and in the fore-and-aft direction by means of a spacer 83*n*.

The keyboard musical instrument achieves all the advantages of the fourth embodiment. Moreover, the controlling system 83 supported by the action brackets 299 allows a tuning worker to easily repair and regulate a relative position between the hammer stopper 83*a* and the hammer assemblies 1*c* by taking out the action brackets 299.

Figure 17:
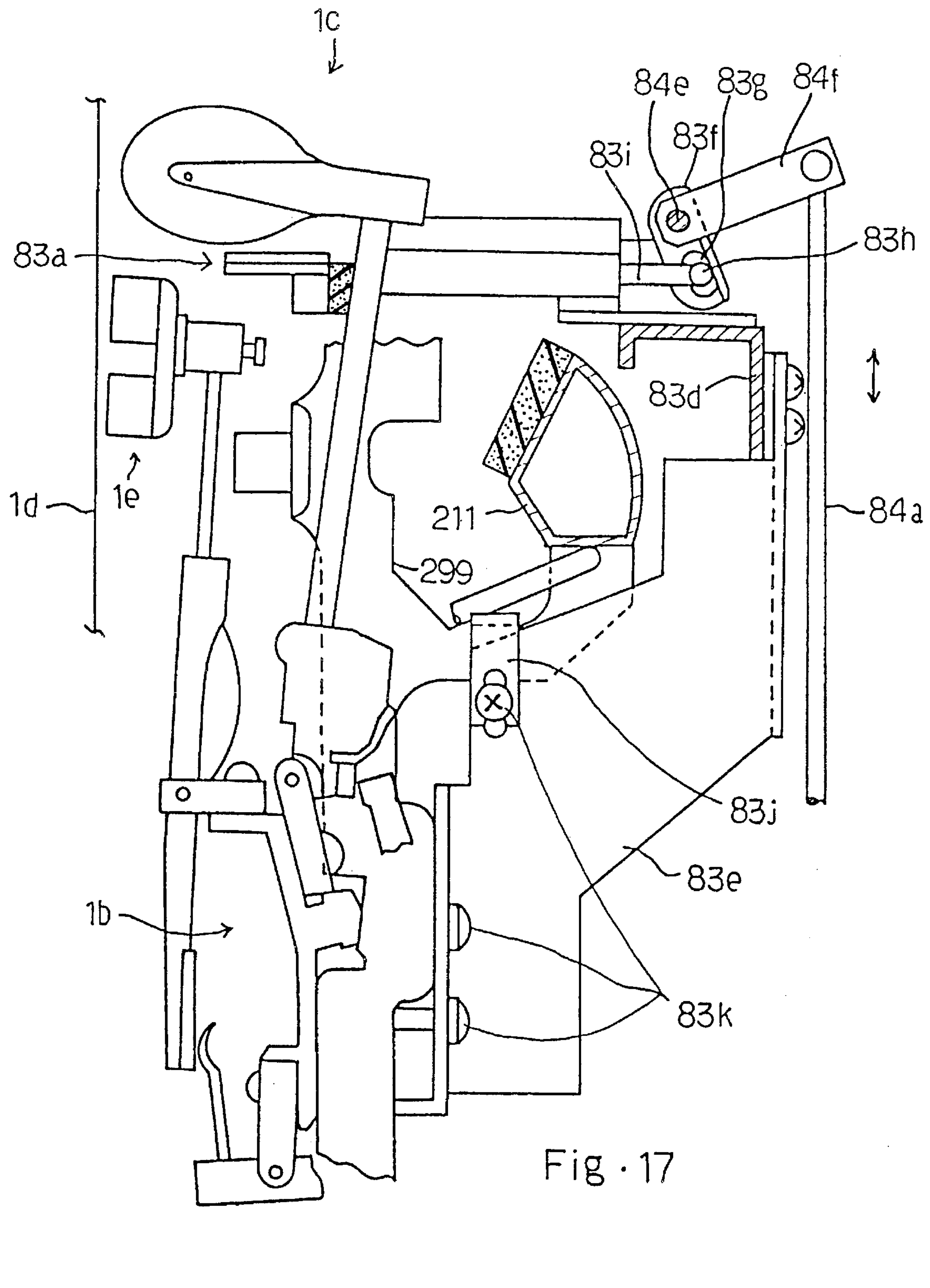
FIG. 17 is a side view showing a first modification of the keyboard musical instrument shown in FIG. 15.
Figure 18:
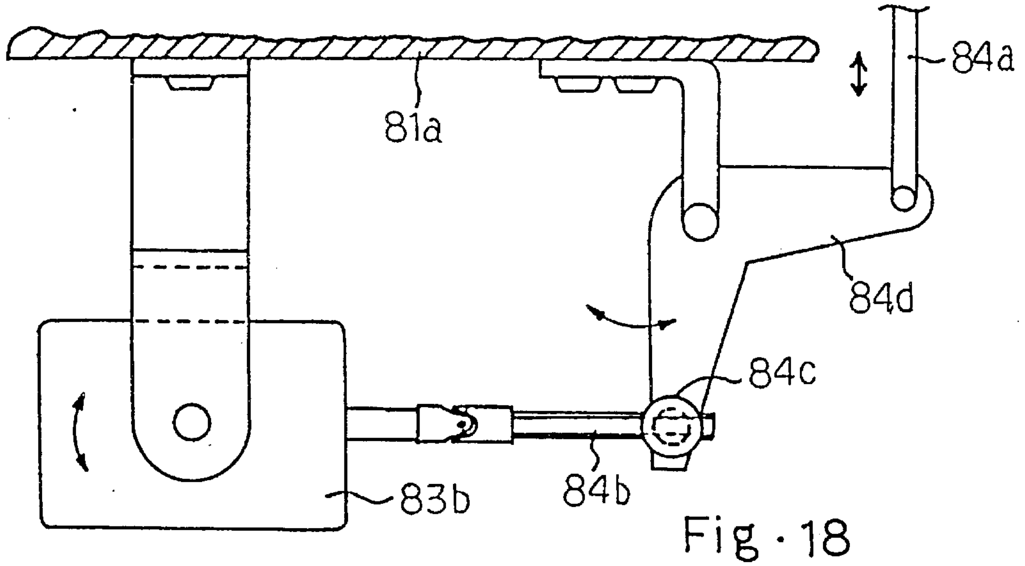
FIG. 18 is a side view showing essential parts of the modification.

FIGS. 17 and 18 show a first modification of the fifth embodiment, and the motor/driving circuit 83*b* is fixed to the lower surface of a key bed 81*a* of the upright piano 81. The rotation of the motor shaft is converted to an up-and-down motion of a link member 84*a* by means of a threaded rod 84*b*, a nut 84*c* and a plate member 84*d*, and the up-and-down motion is converted to a rotation of a shaft 84*e* by means of a lever 84*f*. The lever 83*f* is fixed to the shaft member 84*e*, and the elongated hole 83*g* and the pin member 83*h* converts the rotation of the shaft member 84*e* to the sliding motion of the arm member 83*i*.

In an assembling work, the motor/driver circuit 83*b* and the plate member 84*d* are attached to the lower surface of the key bed 81*a*, and the bracket 83*e*, the main beam 83*d* and other component members except for the rod member 84*a* are integrated with the action brackets 299. Thereafter, the rod member 84*a* is connected between the plate member 84*d* and the lever 84*f*. Thus, the separation between the motor/driving circuit 83*b*/ the plate member 84*d* and the other components makes the assembling work easy.

The link member 84*a* may be actuated by a pedal or a grip in another modification.

In each of the keyboard musical instruments shown in FIGS. 15 and 17, a player instructs the controlling system 83 to change the hammer stopper 83*a* between the free position and the blocking position, and can perform a music with either acoustic or electronic sounds.

The fifth embodiment and the first modification achieve all the advantages of the present invention, and the first modification requires narrower space for the controlling system than the fifth embodiment, because the motor/driving circuit 83*b* is moved under the key bed 81*a*.

Sixth Embodiment

Figure 19:
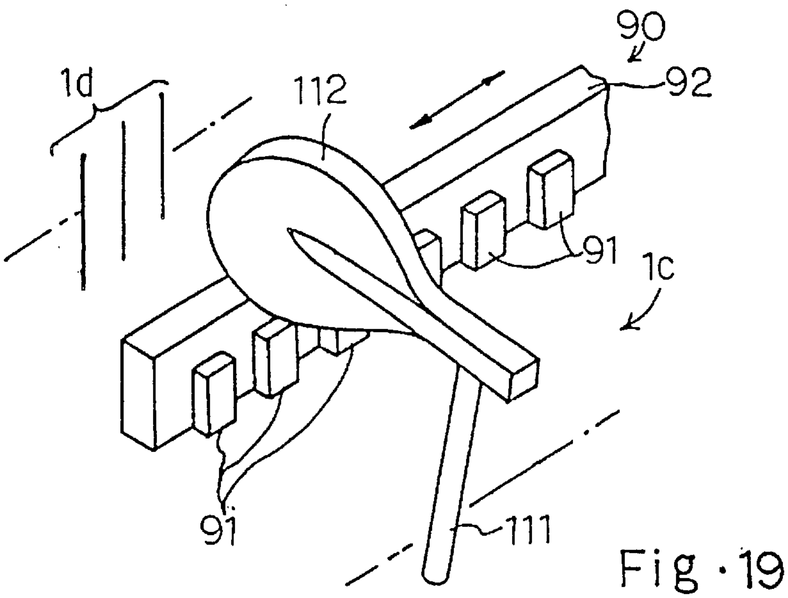
FIG. 19 is a perspective view showing essential parts of a keyboard musical instrument according to the present invention.

FIG. 19 illustrates a keyboard musical instrument embodying the present invention. The keyboard musical instrument implementing the sixth embodiment largely comprises an upright piano, an electronic sound generating system and a controlling system. The upright piano and the electronic sound generating system are similar to those of the first to fifth embodiments, and no description is made thereon.

In the sixth embodiment, a hammer stopper 90 implemented by a plurality of cushion members 91 fixed to a board member 92 at a predetermined pitch about 13 millimeters, and the pitch is equal to the hammer assemblies 1*c*. The board member 92 is changed between the free position and the blocking position through a lateral movement by a half of the pitch. The board member 92 is driven by a slidable arm members mounted on a main beam as similar to the fourth and fifth embodiments, and a converting mechanism is inserted between the slidable arm members and the board member 92 for changing the fore-and-aft motion to the lateral motion.

The keyboard musical instrument shown in FIG. 19 achieve all the advantages, and the controlling system 90 is desirable for a small-sized upright piano, because the distance between the strings 1*d* and the hammer assemblies 1*c* is very narrow.

Although particular embodiments of the present invention have been shown and described, it will be obvious to those skilled in the art that various changes and modifications may be made without departing from the spirit and scope of the present invention.

For example, an automatic player piano is available for the keyboard musical instrument according to the present invention instead of the upright piano 1, and the controlling systems are desirable for remodeling an acoustic piano and the automatic player piano to the keyboard musical instrument according to the present invention.

Moreover, the keyboard musical instruments implementing the first to third embodiments has the controlling systems supported to the hammer rails 221. In the electronic sound mode, a player is not allowed to step on the soft pedal 1*f*, and the hammer rails 221 are expected to maintain the hammer stoppers at the blocking position. However, if the player mistakenly steps on the soft pedal 1*f*, the hammer rails 221 render the hammer stoppers closer to the strings, and the hammer heads reach the strings. In order to prevent the strings from the hammer heads in the electronic sound mode, the adjusting mechanisms or the driver unit may be linked with the soft pedal 1*f* so as to change the blocking position, or the soft pedal 1*f* may be interlocked in the electronic sound mode.

What is claimed is:

1. A keyboard musical instrument having at least an acoustic sound mode and an electronic sound mode, comprising:

a) an acoustic piano having
   - a keyboard implemented by a plurality of keys depressed by a player in both acoustic and electronic sound modes and respectively assigned notes of a scale,
   - a plurality of key action mechanisms functionally connected to said plurality of keys, respectively, and selectively actuated by keys depressed by said player,
   - a plurality of hammer assemblies respectively associated with said plurality of key action mechanisms and selectively driven for rotation by the actuated key action mechanisms, and
   - a plurality of sets of strings respectively associated with said plurality of hammer assemblies and selectively struck by the hammer assemblies driven by said actuated key action mechanisms for producing acoustic sounds with tones identical with the tones of said depressed keys;

b) an electronic sound generating system monitoring said keyboard for detecting said depressed keys, and producing electronic sounds with tones identical with said tones of said depressed keys; and c) a controlling system having
   - a hammer stopper projecting into a space between said plurality of hammer mechanisms and said plurality of sets of strings, said hammer stopper being changeable between a free position in said acoustic sound mode and a blocking position in said electronic sound mode, and having rigid arm members, a retaining means extending in said space between said rigid arm members and a cushion means attached to said retaining means and faced to said hammer assemblies, the hammer assemblies driven by said actuated key action mechanisms rebounding on said hammer stopper in said blocking position before striking the associated sets of strings, said hammer assemblies driven by said actuated key action mechanisms striking said associated sets of strings without an interruption by said hammer stopper in said free position, and driving means, provided in another space opposite to said space with respect to said plurality of hammer assemblies, for changing said hammer stopper between said free position and said blocking position, said driving means having bearing units rotatably supporting said rigid arm members, a motor unit bi-directionally rotatable and a transferring means provided between said rigid arm members and said motor unit for transferring a rotation of a shaft member of said motor unit to said rigid arm members, thereby causing said cushion means to become close to and spaced from said plurality of hammer assemblies depending upon a direction of said rotation.

2. The keyboard musical instrument as set forth in claim 1, in which said driving means is supported by a hammer rail of said acoustic piano.

3. The keyboard musical instrument as set forth in claim 1, in which said transferring means has a pusher fixed to said shaft member, a projection fixed to one of said rigid arm members and a spring for pressing said projection to said pusher.

4. A keyboard musical instrument having at least an acoustic sound mode and an electronic sound mode, comprising:

a) an acoustic piano having a keyboard implemented by a plurality of keys depressed by a player in both acoustic and electronic sound modes and respectively assigned notes of a scale, a plurality of key action mechanisms functionally connected to said plurality of keys, respectively, and selectively actuated by keys depressed by said player, a plurality of hammer assemblies respectively associated with said plurality of key action mechanisms and selectively driven for rotation by the actuated key action mechanisms, and a plurality of sets of strings respectively associated with said plurality of hammer assemblies and selectively struck by the hammer assemblies driven by said actuated key action mechanisms for producing acoustic sounds with tones identical with the tones of said depressed keys;

b) an electronic sound generating system monitoring said keyboard for detecting said depressed keys, and producing electronic sounds with tones identical with said tones of said depressed keys; and c) a controlling system having a hammer stopper projecting into a space between said plurality of hammer mechanisms and said plurality of sets of strings, said hammer stopper being changeable between a free position in said acoustic sound mode and a blocking position in said electronic sound mode, and having rigid arm members, a retaining means extending in said space between said rigid arm members and a cushion means attached to said retaining means and faced to said hammer assemblies, the hammer assemblies driven by said actuated key action mechanisms rebounding on said hammer stopper in said blocking position before striking the associated sets of strings, said hammer assemblies driven by said actuated key action mechanisms striking said associated sets of strings without an interruption by said hammer stopper in said free position, and driving means provided in another space opposite to said space with respect to said plurality of hammer assemblies for changing said hammer stopper between said free position and said blocking position, and having link members rotatably connected to said rigid arm members, bearing units rotatably supporting said link members, a manipulatable member manipulated by said player, a link mechanism connected to said manipulatable member and actuated by said manipulatable member and a converting means connected between said link mechanism and one of said link members for converting a motion of said link mechanism to a bi-directional angular motion of said link mechanisms, thereby causing said cushion means to be close to and spaced from said plurality of hammer assemblies depending upon the motion of said manipulatable member.

5. The keyboard musical instrument as set forth in claim 4, in which said driving means is supported by a hammer rail of said acoustic piano.

6. The keyboard musical instrument as set forth in claim 4, in which said converting means has a cam member held in contact with one of said link members and driven by said link mechanism and a spring for pressing said cam member to said one of said link mechanisms.

7. A keyboard musical instrument having at least an acoustic sound mode and an electronic sound mode, comprising:

a) an acoustic piano having a keyboard implemented by a plurality of keys depressed by a player in both acoustic and electronic sound modes and respectively assigned notes of a scale, a plurality of key action mechanisms functionally connected to said plurality of keys, respectively, and selectively actuated by keys depressed by said player, a plurality of hammer assemblies respectively associated with said plurality of key action mechanisms and selectively driven for rotation by the actuated key action mechanisms, and a plurality of sets of strings respectively associated with said plurality of hammer assemblies and selectively struck by the hammer assemblies driven by said actuated key action mechanisms for producing acoustic sounds with tones identical with the tones of said depressed keys;

b) an electronic sound generating system monitoring said keyboard for detecting said depressed keys, and producing electronic sounds with tones identical with said tones of said depressed keys; and c) a controlling system having a hammer stopper projecting into a space between said plurality of hammer mechanisms and said plurality of sets of strings, and changeable between a free position in said acoustic sound mode and a blocking position in said electronic sound mode, the hammer assemblies driven by said actuated key action mechanisms rebounding on said hammer stopper in said blocking position before striking the associated sets of strings, said hammer assemblies driven by said actuated key action mechanisms striking said associated sets of strings without an interruption by said hammer stopper in said free position, and driving means, provided in another space opposite to said space with respect to said plurality of hammer assemblies, for changing said hammer stopper between said free position and said blocking position, said hammer stopper and said driving means being supported through a beam member by side boards of said acoustic piano.

8. The keyboard musical instrument as set forth in claim 7, in which said driving mechanism changes said hammer stopper between said free position and said blocking position through a reciprocal motion of said hammer stopper.

9. A keyboard musical instrument having at least an acoustic sound mode and an electronic sound mode, comprising:

a) an acoustic piano having a keyboard implemented by a plurality of keys depressed by a player in both acoustic and electronic sound modes and respectively assigned notes of a scale, a plurality of key action mechanisms functionally connected to said plurality of keys, respectively, and selectively actuated by keys depressed by said player, a plurality of hammer assemblies respectively associated with said plurality of key action mechanisms and selectively driven for rotation by the actuated key action mechanisms, and a plurality of sets of strings respectively associated with said plurality of hammer assemblies and selectively struck by the hammer assemblies driven by said actuated key action mechanisms for producing acoustic sounds with tones identical with the tones of said depressed keys;

b) an electronic sound generating system monitoring said keyboard for detecting said depressed keys, and producing electronic sounds with tones identical with said tones of said depressed keys; and c) a controlling system having a hammer stopper projecting into a space between said plurality of hammer mechanisms and said plurality of sets of strings, and changeable between a free position in said acoustic sound mode and a blocking position in said electronic sound mode, the hammer assemblies driven by said actuated key action mechanisms rebounding on said hammer stopper in said blocking position before striking the associated sets of strings, said hammer assemblies driven by said actuated key action mechanisms striking said associated sets of strings without an interruption by said hammer stopper in said free position, and driving means, provided in another space opposite to said space with respect to said plurality of hammer assemblies, for changing said stopper between said free position and said blocking position, said hammer stopper and said driving means being supported through a beam member by action brackets of said acoustic piano.

* * * * *